(12) United States Patent
Baldwin et al.

(10) Patent No.: US 11,763,670 B2
(45) Date of Patent: *Sep. 19, 2023

(54) METHOD OF AUTOMATICALLY CONTROLLING AN AUTONOMOUS VEHICLE BASED ON ELECTRONIC MESSAGES FROM ROADSIDE INFRASTRUCTURE OR OTHER VEHICLES

(71) Applicant: Aptiv Technologies Limited, St. Michael (BB)

(72) Inventors: Craig A. Baldwin, Pleasant Ridge, MI (US); Robert James Myers, Saline, MI (US)

(73) Assignee: Aptiv Technologies Limited, St. Michael (BB)

( * ) Notice: Subject to any disclaimer, the term of this patent is extended or adjusted under 35 U.S.C. 154(b) by 156 days.

This patent is subject to a terminal disclaimer.

(21) Appl. No.: 17/204,816

(22) Filed: Mar. 17, 2021

(65) Prior Publication Data

US 2021/0201678 A1 Jul. 1, 2021

Related U.S. Application Data

(63) Continuation of application No. 16/172,133, filed on Oct. 26, 2018, now Pat. No. 10,991,247, which is a
(Continued)

(51) Int. Cl.
*G08G 1/16* (2006.01)
*B60T 7/00* (2006.01)
(Continued)

(52) U.S. Cl.
CPC .......... *G08G 1/096725* (2013.01); *B60T 7/00* (2013.01); *B60T 7/18* (2013.01);
(Continued)

(58) Field of Classification Search
CPC ........... G08G 1/096725; G08G 1/0965; G08G 1/096741; G08G 1/096783; G08G 1/0968;
(Continued)

(56) References Cited

U.S. PATENT DOCUMENTS 5,629,690 A 5/1997 Knoll
5,995,898 A 11/1999 Tuttle
(Continued)

FOREIGN PATENT DOCUMENTS

EP 3078987 10/2016
JP H07190732 7/1995
(Continued)

OTHER PUBLICATIONS

"Corrected Notice of Allowance", U.S. Appl. No. 16/172,133, filed Mar. 24, 2021, 2 pages.
(Continued)

*Primary Examiner* — Yonel Beaulieu
(74) *Attorney, Agent, or Firm* — Sawtooth Patent Group PLLC

(57) ABSTRACT

A method of operating a vehicle, such as an autonomous vehicle, includes the steps of receiving a message from roadside infrastructure via an electronic receiver and providing, by a computer system in communication with said electronic receiver, instructions based on the message to automatically implement countermeasure behavior by a vehicle system. Additionally or alternatively, the method may include the steps of receiving a message from another vehicle via an electronic receiver and providing, by a computer system in communication with said electronic receiver, instructions based on the message to automatically implement countermeasure behavior by a vehicle system.

20 Claims, 10 Drawing Sheets

Related U.S. Application Data continuation of application No. 15/546,196, filed as application No. PCT/US2015/064235 on Dec. 7, 2015, now abandoned.

(60) Provisional application No. 62/112,786, filed on Feb. 6, 2015.

(51) Int. Cl.
| | | |
|---|---|---|
| *B60T 7/18* | (2006.01) | |
| *B60T 7/22* | (2006.01) | |
| *B60W 10/18* | (2012.01) | |
| *B60W 10/20* | (2006.01) | |
| *B60W 30/09* | (2012.01) | |
| *G05D 1/00* | (2006.01) | |
| *B60W 10/04* | (2006.01) | |
| *G08G 1/0967* | (2006.01) | |
| *G08G 1/0965* | (2006.01) | |
| *G08G 1/0968* | (2006.01) | |
| *B60W 30/00* | (2006.01) | |
| *G05D 1/02* | (2020.01) | |
| *B60W 30/18* | (2012.01) | |
| *B60W 30/188* | (2012.01) | |

(52) U.S. Cl.
CPC .............. *B60T 7/22* (2013.01); *B60W 10/04* (2013.01); *B60W 10/18* (2013.01); *B60W 10/20* (2013.01); *B60W 30/00* (2013.01); *B60W 30/09* (2013.01); *B60W 30/188* (2013.01); *B60W 30/18163* (2013.01); *G05D 1/0088* (2013.01); *G05D 1/0223* (2013.01); *G05D 1/0261* (2013.01); *G05D 1/0274* (2013.01); *G05D 1/0285* (2013.01); *G08G 1/0965* (2013.01); *G08G 1/0968* (2013.01); *G08G 1/096741* (2013.01); *G08G 1/096783* (2013.01); *G08G 1/16* (2013.01); *G08G 1/166* (2013.01); *B60T 2201/022* (2013.01); *B60T 2210/32* (2013.01); *B60W 2510/20* (2013.01); *B60W 2520/10* (2013.01); *B60W 2554/801* (2020.02); *B60W 2556/45* (2020.02); *G05D 2201/0213* (2013.01)

(58) Field of Classification Search
CPC . G08G 1/16; G08G 1/166; G08G 1/00; B60T 7/00; B60T 7/18; B60T 7/22; B60T 2201/022; B60T 2210/32; B60W 10/04; B60W 10/18; B60W 10/20; B60W 30/00; B60W 30/09; B60W 30/18163; B60W 30/188; B60W 2510/20; B60W 2520/10; B60W 2554/801; B60W 2556/45; G05D 1/0088; G05D 1/0223; G05D 1/0261; G05D 1/0274; G05D 1/0285; G05D 2201/0213; G05D 1/00

See application file for complete search history.

(56) References Cited

U.S. PATENT DOCUMENTS

| | | | |
|---|---|---|---|
| 6,442,473 | B1 | 8/2002 | Berstis et al. |
| 6,526,352 | B1 | 2/2003 | Breed et al. |
| 6,707,391 | B1 | 3/2004 | Monroe |
| 6,747,779 | B1 | 6/2004 | Morin et al. |
| 6,810,321 | B1 | 10/2004 | Cook |
| 6,862,537 | B2 | 3/2005 | Skrbina et al. |
| 6,864,784 | B1 | 3/2005 | Loeb |
| 6,919,917 | B1 | 7/2005 | Janssen |
| 6,959,994 | B2 | 11/2005 | Fujikawa et al. |
| 7,075,427 | B1 | 7/2006 | Pace et al. |
| 7,103,460 | B1 | 9/2006 | Breed |
| 7,637,631 | B2 | 12/2009 | McDermott et al. |
| 8,199,046 | B2 | 6/2012 | Nanami |
| 8,478,472 | B2 | 7/2013 | Bageshwar et al. |
| 8,480,142 | B2 | 7/2013 | Wuerfel |
| 8,521,352 | B1 | 8/2013 | Ferguson et al. |
| 8,589,014 | B2 | 11/2013 | Fairfield et al. |
| 8,600,606 | B2 | 12/2013 | Nickolaou et al. |
| 8,612,135 | B1 | 12/2013 | Montemerlo et al. |
| 8,718,861 | B1 | 5/2014 | Montemerlo et al. |
| 8,781,669 | B1 | 7/2014 | Teller et al. |
| 8,818,682 | B1 | 8/2014 | Dolgov et al. |
| 8,825,259 | B1 | 9/2014 | Ferguson et al. |
| 8,825,265 | B1 | 9/2014 | Ferguson et al. |
| 8,849,494 | B1 | 9/2014 | Herbach et al. |
| 8,855,849 | B1 | 10/2014 | Ferguson et al. |
| 8,874,267 | B1 | 10/2014 | Dolgov et al. |
| 8,874,305 | B2 | 10/2014 | Dolgov et al. |
| 8,874,372 | B1 | 10/2014 | Zhu et al. |
| 8,880,272 | B1 | 11/2014 | Ferguson et al. |
| 8,935,034 | B1 | 1/2015 | Zhu et al. |
| 9,274,526 | B2 | 3/2016 | Murai et al. |
| 9,377,531 | B2 | 6/2016 | Rostocki et al. |
| 9,429,440 | B2 | 8/2016 | Harada |
| 9,501,058 | B1 | 11/2016 | Mariet |
| 10,083,607 | B2 | 9/2018 | Ginsberg et al. |
| 10,209,717 | B2 | 2/2019 | Hazelton |
| 10,235,882 | B1 * | 3/2019 | Aoude .................. G08G 1/163 |
| 10,311,724 | B2 | 6/2019 | Ginsberg et al. |
| 10,466,717 | B1 * | 11/2019 | Su ............................. G06N 3/08 |
| 10,525,901 | B2 | 1/2020 | Lewis et al. |
| 10,678,261 | B2 | 6/2020 | Baldwin |
| 10,948,924 | B2 | 3/2021 | Baldwin et al. |
| 10,991,247 | B2 | 4/2021 | Baldwin et al. |
| 2005/0187701 | A1 | 8/2005 | Baney |
| 2005/0280552 | A1 | 12/2005 | DiPiazza |
| 2007/0005202 | A1 | 1/2007 | Breed |
| 2007/0005609 | A1 | 1/2007 | Breed |
| 2007/0046448 | A1 | 3/2007 | Smitherman |
| 2007/0055446 | A1 | 3/2007 | Schiffmann et al. |
| 2008/0225395 | A1 | 9/2008 | Veerasamy |
| 2009/0140887 | A1 | 6/2009 | Breed et al. |
| 2009/0164109 | A1 | 6/2009 | Maruyama |
| 2010/0007523 | A1 | 1/2010 | Hatav |
| 2010/0013615 | A1 | 1/2010 | Herbert et al. |
| 2010/0023183 | A1 | 1/2010 | Huang et al. |
| 2010/0026555 | A1 | 2/2010 | Whittaker et al. |
| 2010/0063720 | A1 | 3/2010 | Machino |
| 2010/0073194 | A1 | 3/2010 | Ghazarian |
| 2010/0104199 | A1 | 4/2010 | Zhang et al. |
| 2010/0106356 | A1 | 4/2010 | Trepagnier et al. |
| 2010/0238006 | A1 | 9/2010 | Grider et al. |
| 2011/0012755 | A1 | 1/2011 | Mudalige |
| 2011/0125405 | A1 | 5/2011 | Blesener et al. |
| 2011/0161987 | A1 | 6/2011 | Huang et al. |
| 2011/0163904 | A1 | 7/2011 | Alland et al. |
| 2011/0184605 | A1 | 7/2011 | Neff |
| 2011/0210866 | A1 | 9/2011 | Klaus et al. |
| 2012/0022776 | A1 | 1/2012 | Razavilar |
| 2012/0039084 | A1 | 2/2012 | Eckhardt et al. |
| 2012/0041632 | A1 | 2/2012 | Bordes |
| 2012/0083987 | A1 | 4/2012 | Schwindt |
| 2012/0139754 | A1 | 6/2012 | Ginsberg et al. |
| 2012/0166033 | A1 | 6/2012 | Byun et al. |
| 2012/0169526 | A1 | 7/2012 | Reihac |
| 2012/0249794 | A1 | 10/2012 | Kiyo et al. |
| 2012/0274481 | A1 | 11/2012 | Ginsberg et al. |
| 2012/0277967 | A1 | 11/2012 | Isaji et al. |
| 2012/0296539 | A1 | 11/2012 | Cooprider et al. |
| 2013/0110368 | A1 | 5/2013 | Zagorski |
| 2013/0127190 | A1 | 5/2013 | Shamoto |
| 2013/0131908 | A1 | 5/2013 | Trepagnier et al. |
| 2013/0184926 | A1 | 7/2013 | Spero et al. |
| 2013/0191022 | A1 | 7/2013 | Mathes et al. |
| 2013/0218396 | A1 | 8/2013 | Moshchuk et al. |
| 2013/0231825 | A1 | 9/2013 | Chundrlik et al. |
| 2013/0265563 | A1 | 10/2013 | Vogt et al. |
| 2013/0271292 | A1 | 10/2013 | McDermott |
| 2013/0321627 | A1 | 12/2013 | Turn et al. |
| 2013/0338858 | A1 | 12/2013 | Cherepinsky |

(56) References Cited

U.S. PATENT DOCUMENTS

| | | | |
|---|---|---|---|
| 2014/0012455 A1 | 1/2014 | Neff | |
| 2014/0032093 A1 | 1/2014 | Mills | |
| 2014/0081507 A1 | 3/2014 | Urmson | |
| 2014/0081573 A1 | 3/2014 | Urmson et al. | |
| 2014/0191882 A1 | 7/2014 | Varma | |
| 2014/0204599 A1 | 7/2014 | Miura et al. | |
| 2014/0210646 A1 | 7/2014 | Subramanua | |
| 2014/0297093 A1 | 10/2014 | Murai et al. | |
| 2014/0330479 A1 | 11/2014 | Dolgov et al. | |
| 2015/0006005 A1 | 1/2015 | Yu et al. | |
| 2015/0019080 A1 | 1/2015 | Schneider | |
| 2015/0041510 A1 | 2/2015 | Frenzel et al. | |
| 2015/0100189 A1 | 4/2015 | Tellis et al. | |
| 2015/0124096 A1 | 5/2015 | Koravadi | |
| 2016/0004915 A1 | 1/2016 | Chen et al. | |
| 2016/0035221 A1 | 2/2016 | McDevitt-Pimbley et al. | |
| 2016/0035223 A1 | 2/2016 | Gutmann et al. | |
| 2016/0161267 A1 | 6/2016 | Harada | |
| 2016/0231746 A1* | 8/2016 | Hazelton | G05D 1/0274 |
| 2017/0039850 A1 | 2/2017 | Vanden Berg et al. | |
| 2017/0124869 A1* | 5/2017 | Popple | G08G 1/087 |
| 2017/0371036 A1 | 12/2017 | Griffin | |
| 2018/0004220 A1 | 1/2018 | Hazelton | |
| 2018/0004221 A1 | 1/2018 | Hazelton | |
| 2018/0004223 A1 | 1/2018 | Baldwin | |
| 2018/0012492 A1 | 1/2018 | Baldwin et al. | |
| 2018/0018877 A1* | 1/2018 | Townsend | G08G 1/096783 |
| 2018/0018888 A1* | 1/2018 | Townsend | B60W 10/18 |
| 2018/0031696 A1 | 2/2018 | Lewis et al. | |
| 2018/0037171 A1 | 2/2018 | Lewis et al. | |
| 2018/0045826 A1 | 2/2018 | Kasaba et al. | |
| 2018/0129215 A1 | 5/2018 | Hazelton et al. | |
| 2018/0151067 A1* | 5/2018 | Maeda | G08G 1/096716 |
| 2018/0262865 A1* | 9/2018 | Lepp | H04W 76/28 |
| 2018/0309592 A1* | 10/2018 | Stolfus | G08G 1/0969 |
| 2019/0003895 A1 | 1/2019 | Krishnan et al. | |
| 2019/0066498 A1 | 2/2019 | Baldwin et al. | |
| 2019/0101929 A1 | 4/2019 | Baldwin | |
| 2019/0202355 A1 | 7/2019 | Tatara et al. | |
| 2019/0210436 A1 | 7/2019 | Frederick et al. | |
| 2020/0341487 A1 | 10/2020 | Hazelton et al. | |
| 2021/0165420 A1 | 6/2021 | Baldwin | |

FOREIGN PATENT DOCUMENTS

| | | | |
|---|---|---|---|
| JP | 2004326705 | 11/2004 | |
| JP | 2007106199 | 4/2007 | |
| JP | 2008003959 | 1/2008 | |
| JP | 2008008870 | 1/2008 | |
| JP | 2010260493 | 11/2010 | |
| JP | 2014148293 | 8/2014 | |
| JP | 2014148393 | 8/2014 | |
| JP | 2014211862 | 11/2014 | |
| KR | 20010109873 | 12/2001 | |
| KR | 20100068944 | 6/2010 | |
| KR | 20110023952 | 3/2011 | |
| KR | 101071914 | 10/2011 | |
| KR | 20120072020 | 7/2012 | |
| KR | 20130026934 | 3/2013 | |
| WO | 2009070069 | 6/2009 | |
| WO | 2016126319 | 8/2016 | |
| WO | 2016126323 | 8/2016 | |
| WO | 20160126318 | 8/2016 | |
| WO | 2019059026 | 3/2019 | |
| WO | WO-2020205597 A1 * | 10/2020 | B60W 40/09 |

OTHER PUBLICATIONS

"Advisory Action", U.S. Appl. No. 15/549,061, filed Apr. 29, 2019, 6 pages.
"Advisory Action", U.S. Appl. No. 15/545,957, filed Jul. 16, 2019, 3 pages.
"Final Office Action", U.S. Appl. No. 15/546,196, filed Aug. 28, 2018, 16 pages.
"Final Office Action", U.S. Appl. No. 15/545,957, filed Apr. 17, 2019, 22 pages.
"Final Office Action", U.S. Appl. No. 15/792,960, filed Sep. 22, 2020, 7 Pages.
"Final Office Action", U.S. Appl. No. 15/549,061, filed Feb. 7, 2019, 9 pages.
"International Preliminary Report on Patentability", Application No. PCT/US2015/064235, dated Aug. 17, 2017, 12 pages.
"International Preliminary Report on Patentability", Application No. PCT/US2015/064243, dated Aug. 17, 2017, 12 pages.
"International Preliminary Report on Patentability", Application No. PCT/US2015/064282, dated Aug. 17, 2017, 16 pages.
"International Preliminary Report on Patentability", Application No. PCT/US2015/064225, dated Aug. 17, 2017, 6 pages.
"International Preliminary Report on Patentability", Application No. PCT/US2015/064283, dated Aug. 17, 2017, 6 pages.
"International Preliminary Report on Patentability", Application No. PCT/US2015/064289, dated Aug. 17, 2017, 6 pages.
"International Preliminary Report on Patentability", Application No. PCT/US2016/014797, dated Aug. 17, 2017, 6 pages.
"International Preliminary Report on Patentability", Application No. PCT/US2015/064231, dated Aug. 17, 2017, 7 pages.
"International Preliminary Report on Patentability", Application No. PCT/US2015/064240, dated Aug. 17, 2017, 7 pages.
"International Preliminary Report on Patentability", Application No. PCT/US2016/016045, dated Aug. 17, 2017, 7 pages.
"International Search Report and Written Opinion", Application No. PCT/US2015/064243, dated Mar. 30, 2016, 13 pages.
"International Search Report and Written Opinion", Application No. PCT/US2015/064235, dated Mar. 22, 2016, 14 pages.
"International Search Report and Written Opinion", Application No. PCT/US2015/064282, dated Mar. 18, 2016, 17 pages.
"International Search Report and Written Opinion", Application No. PCT/US2015/064289, dated Mar. 2, 2016, 7 pages.
"International Search Report and Written Opinion", Application No. PCT/US2015/064283, dated Apr. 15, 2016, 7 pages.
"International Search Report and Written Opinion", Application No. PCT/US2015/064225, dated Apr. 22, 2016, 7 pages.
"International Search Report and Written Opinion", Application No. PCT/US2016/014797, dated May 11, 2016, 7 pages.
"International Search Report and Written Opinion", Application No. PCT/US2015/064240, dated Mar. 18, 2016, 8 pages.
"International Search Report and Written Opinion", Application No. PCT/US2015/064231, dated May 30, 2016, 8 pages.
"International Search Report and Written Opinion", Application No. PCT/US2016/016045, dated May 24, 2016, 9 pages.
"Non-Final Office Action", U.S. Appl. No. 15/549,061, filed Sep. 5, 2018, 11 pages.
"Non-Final Office Action", U.S. Appl. No. 15/545,960, filed Jun. 15, 2018, 12 pages.
"Non-Final Office Action", U.S. Appl. No. 15/545,957, filed Oct. 15, 2018, 15 pages.
"Non-Final Office Action", U.S. Appl. No. 15/545,957, filed Aug. 16, 2019, 19 pages.
"Non-Final Office Action", U.S. Appl. No. 15/546,196, filed Apr. 5, 2018, 22 pages.
"Non-Final Office Action", U.S. Appl. No. 15/792,960, filed Mar. 19, 2020, 6 pages.
"Non-Final Office Action", U.S. Appl. No. 15/545,944, filed May 18, 2018, 6 pages.
"Non-Final Office Action", U.S. Appl. No. 14/983,695, filed Aug. 1, 2017, 6 pages.
"Non-Final Office Action", U.S. Appl. No. 16/172,133, filed Oct. 16, 2020, 7 pages.
"Non-Final Office Action", U.S. Appl. No. 15/544,283, filed Jun. 8, 2018, 8 pages.
"Non-Final Office Action", U.S. Appl. No. 16/208,828, filed Jul. 21, 2020, 9 Pages.
"Notice of Allowance", U.S. Appl. No. 15/545,957, filed Mar. 12, 2020, 10 pages.
"Notice of Allowance", U.S. Appl. No. 15/549,025, filed Sep. 3, 2019, 7 pages.

(56) References Cited

OTHER PUBLICATIONS

"Notice of Allowance", U.S. Appl. No. 16/208,828, filed Nov. 12, 2020, 7 pages.
"Notice of Allowance", U.S. Appl. No. 15/545,944, filed Oct. 19, 2018, 8 pages.
"Notice of Allowance", U.S. Appl. No. 16/172,133, filed Dec. 18, 2020, 9 pages.
"Restriction Requirement", U.S. Appl. No. 15/792,960, filed Jan. 9, 2020, 6 pages.
"Restriction Requirement", U.S. Appl. No. 14/983,695, filed Jun. 29, 2017, 8 pages.
"Restriction Requirement", U.S. Appl. No. 15/545,957, filed Sep. 17, 2018, 9 pages.
"Supplemental Notice of Allowance", U.S. Appl. No. 16/208,828, filed Feb. 19, 2021, 2 pages.

\* cited by examiner

METHOD OF AUTOMATICALLY CONTROLLING AN AUTONOMOUS VEHICLE BASED ON ELECTRONIC MESSAGES FROM ROADSIDE INFRASTRUCTURE OR OTHER VEHICLES

CROSS-REFERENCE TO RELATED APPLICATION

This application is a continuation application and claims the benefit under 35 U.S.C § 120 of U.S. patent application Ser. No. 16/172,133, filed Oct. 26, 2018, now U.S. Pat. No. 10,991,247, which is a continuation of and claims benefit under 35 U.S.C. § 120 of U.S. patent application Ser. No. 15/546,196, filed Jul. 25, 2017, which is a national stage application under 35 U.S.C. § 371 of PCT Application Number PCT/US2015/64235 having an international filing date of Dec. 7, 2015, which designated the United States, said PCT application claiming the benefit of priority under Article 8 of the Patent Cooperation Treaty to U.S. Provisional Patent Application No. 62/112,786, filed Feb. 6, 2015, the entire disclosures of each of which are hereby incorporated herein by reference.

TECHNICAL FIELD OF THE INVENTION

The invention relates to a method of automatically controlling an autonomous vehicle, particularly to a method based on receiving electronic messages from roadside infrastructure or other vehicles.

BACKGROUND OF THE INVENTION

Some vehicles are configured to operate automatically so that the vehicle navigates through an environment with little or no input from a driver. Such vehicles are often referred to as "autonomous vehicles". These autonomous vehicles typically include one or more sensors that are configured to sense information about the environment. The autonomous vehicle may use the sensed information to navigate through the environment. For example, if the sensors sense that the autonomous vehicle is approaching an intersection with a traffic signal, the sensors must determine the state of the traffic signal to determine whether the autonomous vehicle needs to stop at the intersection. The traffic signal may be obscured to the sensor by weather conditions, roadside foliage, or other vehicles between the sensor and the traffic signal. Therefore, a more reliable method of determining the status of roadside infrastructure is desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, a method off operating an autonomous vehicle is provided. The method includes the step of receiving a message from roadside infrastructure via an electronic receiver and the step of providing, by a computer system in communication with the electronic receiver, instructions based on the message to automatically implement countermeasure behavior by a vehicle system.

According to a first example, the roadside infrastructure is a traffic signaling device and data contained in the message includes a device location, a signal phase, and a phase timing. The vehicle system is a braking system. The step of providing instructions includes the sub-steps of:
  determining a vehicle speed,
  determining the signal phase in a current vehicle path,
    determining a distance between the vehicle and the device location, and
  providing, by the computer system, instructions to the braking system to apply vehicle brakes based on the vehicle speed, the signal phase of the current vehicle path, and the distance between the vehicle and the device location.

According to a second example, the roadside infrastructure is a construction zone warning device and data contained in the message includes the information of a zone location, a zone direction, a zone length, a zone speed limit, and/or lane closures. The vehicle system may be a braking system, a steering system, and/or a powertrain system. The step of providing instructions may include the sub-steps of:
  determining a vehicle speed,
  determining a lateral vehicle location within a roadway,
  determining a distance between the vehicle and the zone location,
  determining a difference between the vehicle speed and the zone speed limit,
  providing, by the computer system, instructions to apply vehicle brakes based on the difference between the vehicle speed and the zone speed limit and the distance between the vehicle and the zone location,
  determining a steering angle based on the lateral vehicle location, the lane closures, the vehicle speed, and the distance between the vehicle and the zone location,
  providing, by the computer system, instructions to the steering system to adjust a vehicle path based on the steering angle, and
  providing, by the computer system, instructions to the powertrain system to adjust the vehicle speed so the vehicle speed is less than or equal to the zone speed limit.

According to a third example, the roadside infrastructure is a stop sign and data contained in the message includes sign location and stop direction. The vehicle system is a braking system. The step of providing instructions may include the sub-steps:
  determining vehicle speed,
  determining the stop direction of a current vehicle path,
  determining a distance between the vehicle and the sign location, and
  providing, by the computer system, instructions to the braking system to apply vehicle brakes based on a vehicle speed, the stop direction of the current vehicle path, and the distance between the vehicle and the sign location.

According to a fourth example, the roadside infrastructure is a railroad crossing warning device and data contained in the message includes device location and warning state. The vehicle system is a braking system. The step of providing instructions includes the sub-steps of:
  determining vehicle speed,
  determining the warning state,
  determining a distance between the vehicle and the device location, and providing, by the computer system, instructions to the braking system to apply vehicle brakes based on the vehicle speed, warning state, and the distance between the vehicle and the device location.

According to a fifth example, the roadside infrastructure is an animal crossing zone warning device and data contained in the message includes zone location, zone direction, and zone length. The vehicle system is a forward looking sensor. The step of providing instructions includes the sub-step of providing, by the computer system, instructions to the forward looking sensor to widen a field of view so as to include at least both road shoulders within the field of view.

According to a sixth example, the roadside infrastructure is a pedestrian crossing warning device and data contained in the message may be crossing location and/or warning state. The vehicle system may be a braking system and/or a forward looking sensor. The step of providing instructions may include the sub-steps of:
  providing, by the computer system, instructions to the forward looking sensor to widen a field of view so as to include at least both road shoulders within the field of view,
  determining vehicle speed,
  determining a distance between the vehicle and the crossing location, and
  providing, by the computer system, instructions to the braking system to apply vehicle brakes based on the vehicle speed, warning state, and the distance between the vehicle and the crossing location.

According to a seventh example, the roadside infrastructure is a school crossing warning device and data contained in the message a device location and a warning state. The vehicle system is a braking system. The step of providing instructions includes the sub-steps of:
  determining vehicle speed,
  determining a lateral location of the device location within a roadway,
  determining a distance between the vehicle and the device location, and
  providing, by the computer system, instructions to the braking system to apply vehicle brakes based on a vehicle speed, the lateral location, the warning state, and the distance between the vehicle and the device location.

According to an eighth example, the roadside infrastructure is a lane direction indicating device and data contained in the message is a lane location and a lane direction. The vehicle system is a roadway mapping system. The step of providing instructions includes the sub-step of providing, by the computer system, instructions to the roadway mapping system to dynamically update the roadway mapping system's lane direction information.

According to a ninth example, the roadside infrastructure is a speed limiting device and data contained in the message includes a speed zone location, a speed zone direction, a speed zone length, and a zone speed limit. The vehicle system is a powertrain system. The step of providing instructions includes the sub-steps of:
  determining a vehicle speed,
  determining a distance between the vehicle and the speed zone location, and
  providing, by the computer system, instructions to the powertrain system to adjust the vehicle speed so that the vehicle speed is less than or equal to the zone speed limit.

According to a tenth example, the roadside infrastructure is a no passing zone device and data contained in the message includes a no passing zone location, a no passing zone direction, and a no passing zone length. The vehicle system includes a powertrain system, a forward looking sensor and/or a braking system. The step of providing instructions may include the sub-steps of:
  detecting another vehicle ahead of the vehicle via the forward looking sensor,
  determining a vehicle speed,
  determining an another vehicle speed.
  determine a safe passing distance for overtaking the another vehicle,
  determining a distance between the vehicle and the no passing zone location,
  providing, by the computer system, instructions to the powertrain system to adjust the vehicle speed so that the vehicle speed is less than or equal to the another vehicle speed when the safe passing distance would end within the no passing zone, and
  providing, by the computer system, instructions to the braking system to adjust the vehicle speed so that the vehicle speed is less than or equal to the another vehicle speed when the safe passing distance would end within the no passing zone.

In accordance with another embodiment, another method of operating an autonomous vehicle is provided. The method comprises the step of receiving a message from another vehicle via an electronic receiver, and the step of providing, by a computer system in communication with said electronic receiver, instructions based on the message to automatically implement countermeasure behavior by a vehicle system.

According to a first example, the other vehicle is a school bus and data contained in the message includes school bus location and stop signal status. The vehicle system is a braking system. The step of providing instructions includes the sub-steps of:
  determining a vehicle speed,
  determining the stop signal status,
  determining a distance between the vehicle and the school bus location, and
  providing, by the computer system, instructions to the braking system to apply vehicle brakes based on the vehicle speed, the stop signal status, and the distance between the vehicle and the school bus location.

According to a second example, the other vehicle is a maintenance vehicle and data contained in the message includes a maintenance vehicle location and a safe following distance. The vehicle system is a powertrain system and/or a braking system. The step of providing instructions may include the sub-steps of:
  determining a distance between the vehicle and the maintenance vehicle location,
  determining a difference between the safe following distance and the distance between the vehicle and the maintenance vehicle location by subtracting the distance between the vehicle and the maintenance vehicle location from the safe following distance,
  providing, by the computer system, instructions to the braking system to apply vehicle brakes when the difference is less than zero, and
  providing, by the computer system, instructions to the powertrain system to adjust a vehicle speed so that the difference is less than or equal to zero.

According to a third example, the other vehicle is an emergency vehicle and data contained in the message may include information regarding an emergency vehicle location, an emergency vehicle speed, and a warning light status. The vehicle system is a braking system, a steering system, a forward looking sensor, and/or a powertrain system. The step of providing instructions may include the sub-steps:

determining a distance between the vehicle and the emergency vehicle, determine a location of an unobstructed portion of a road shoulder via the forward looking sensor based on the distance between the vehicle and the emergency vehicle, the emergency vehicle speed, and warning light status, providing, by the computer system, instructions to apply vehicle brakes based on the distance between the vehicle and the emergency vehicle, the emergency vehicle speed, and the location of the unobstructed portion of the road shoulder, determining a steering angle based on the distance between the vehicle and the emergency vehicle, the emergency vehicle speed, and the location of the unobstructed portion of the road shoulder, providing, by the computer system, instructions to the steering system to adjust a vehicle path based on the steering angle, and providing, by the computer system, instructions to the powertrain system to adjust a vehicle speed based on the distance between the vehicle and the emergency vehicle, the emergency vehicle speed, and the location of the unobstructed portion of the road shoulder.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Because portions of the driving environment may be obscured to environmental sensors, such as forward looking sensors, it is desirable to supplement senor inputs. Presented herein is a method of operating an automatically controlled or "autonomous" vehicle wherein the vehicle receives electronic messages from various elements of the transportation infrastructure, such as traffic signals, signage, or other vehicles. The infrastructure contains wireless transmitters that broadcast information about the state of each element of the infrastructure, such as location and operational state. The information may be broadcast by a separate transmitter associated with each element of infrastructure or it may be broadcast by a central transmitter. The infrastructure information is received by the autonomous vehicle and a computer system on-board the autonomous vehicle then determines whether countermeasures are required by the autonomous vehicle and sends instructions to the relevant vehicle system, e.g. the braking system, to perform the appropriate actions.

Figure 1:
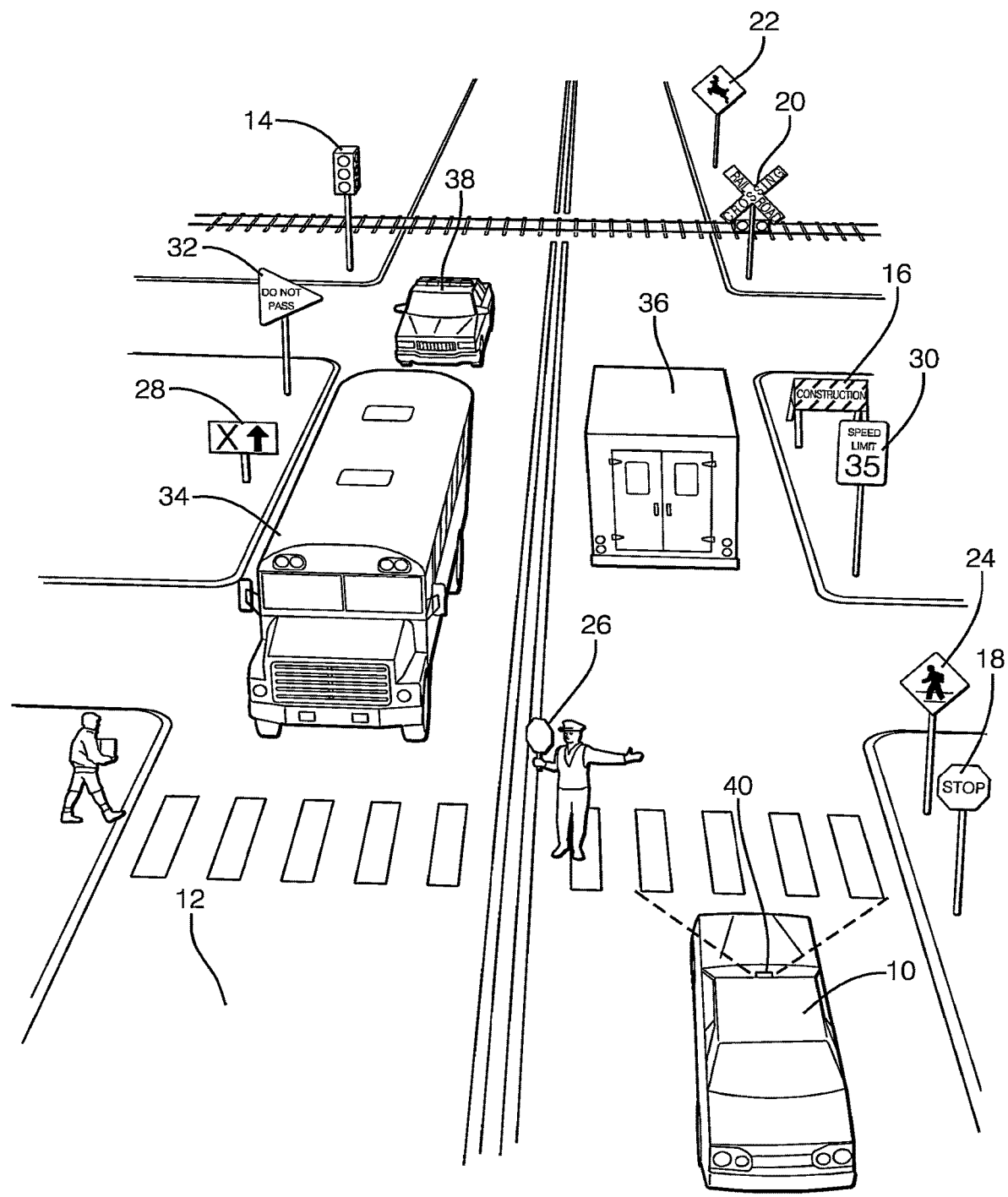
FIG. 1 is a diagram of an operating environment for an autonomous vehicle.

FIG. 1 illustrates a non-limiting example of an environment in which an automatically controlled vehicle, hereinafter referred to as the autonomous vehicle 10, may operate. The autonomous vehicle 10 travels along a roadway 12 having various associated infrastructure elements. The illustrated examples of infrastructure elements include:

a traffic signaling device 14, e.g. "stop light'. The traffic signaling device 14 transmits an electronic signal that includes information regarding the traffic signaling device's location, signal phase, e.g. direction of stopped traffic, direction of flowing traffic, left or right turn indicators active, and phase timing, i.e. time remaining until the next phase change.

a construction zone warning device 16 that may include signage, barricades, traffic barrels, barriers, or flashers. The construction zone warning device 16 transmits an electronic signal that may include information regarding the location of the construction zone, the construction zone direction, e.g. northbound lanes, the length of the construction zone, the speed limit within the construction zone, and an indication of any roadway lanes that are closed.

a stop sign 18. The stop sign 18 transmits an electronic signal that may include information regarding the sign location, stop direction, i.e. the autonomous vehicle 10 needs to stop or cross traffic needs to stop, and number of stop directions, i.e. two or four way stop.

a railroad crossing warning device 20. The railroad crossing warning device 20 transmits an electronic signal that may include information regarding the railroad crossing warning device location and warning state.

an animal crossing zone warning device 22, e.g. a deer area or moose crossing sign. The animal crossing zone warning device 22 transmits an electronic signal that may include information regarding the animal crossing zone location, animal crossing zone direction, e.g. southbound lanes, and animal crossing zone length a pedestrian crossing warning device 24. The pedestrian warning device may be a sign marking a pedestrian crossing or it may incorporate a warning system activated by the pedestrian when entering the crossing. The pedestrian crossing warning device 24 transmits an electronic signal that may include information regarding the pedestrian crossing location and warning state, e.g. pedestrian in walkway.

a school crossing warning device 26. The school crossing warning device 26 may be a handheld sign used by a school crossing guard. A warning signal, in the form of flashing lights may be activated by the crossing guard when a child is in the crossing. The school crossing warning device 26 transmits an electronic signal that may include information regarding the school crossing warning device location and warning state.

a lane direction indicating device 28. The lane direction indicating device 28 transmits an electronic signal that may include information regarding the lane location and a lane direction of each lane location.

a speed limiting device 30, e.g. a speed limit sign. The speed limiting device 30 transmits an electronic signal that may include information regarding the speed zone's location, the speed zone's direction, the speed zone length, and the speed limit within the speed zone.

a no passing zone warning device 32, e.g. a no passing zone sign. The no passing zone warning device 32 transmits an electronic signal that may include information regarding the no passing zone's location, the no passing zone's direction, and the no passing zone's length.

The environment in which the autonomous vehicle 10 operates may also include other vehicles with which the autonomous vehicle 10 may interact. The illustrated examples of other vehicles include:

a school bus 34. The school bus 34 transmits an electronic signal that includes information regarding the school bus's location and stop signal status.

a maintenance vehicle 36, e.g. snow plow or lane marker. The maintenance vehicle 36 transmits an electronic signal that includes information regarding the maintenance vehicle's location and the safe following distance required.

an emergency vehicle 38, e.g. police car or ambulance. The emergency vehicle 38 transmits an electronic signal that includes information regarding the emergency vehicle's location, the emergency vehicle's speed, and the emergency vehicle's warning light status.

The autonomous vehicle 10 includes a computer system connected to a wireless receiver that is configured to receive the electronic messages from the transmitters associated with the infrastructure and/or other vehicles. The transmitters and receivers may be configured to communicate using any of a number of protocols, including Dedicated Short Range Communication (DSRC) or WIFI (IEEE 802.11x). The transmitters and receivers may alternatively be transceivers allowing two-way communication between the infrastructure and/or other vehicles and the autonomous vehicle 10. The computer system is interconnected to various sensors and actuators responsible for controlling the various systems in the autonomous vehicle 10, such as the braking system, the powertrain system, and the steering system. The computer system may be a central processing unit or may be several distributed processors communication over a communication bus, such as a Controller Area Network (CAN) bus.

The autonomous vehicle 10 further includes a locating device configured to determine both the geographical location of the autonomous vehicle 10 as well as the vehicle speed. An example of such a device is a Global Positioning System (GPS) receiver.

The autonomous vehicle 10 may also include a forward looking sensor 40 configured to identify objects in the forward path of the autonomous vehicle 10. Such a forward looking sensor 40 may be a visible light camera, an infrared camera, a radio detection and ranging (RADAR) transceiver, and/or a laser imaging, detecting and ranging (LIDAR) transceiver.

Figure 2:
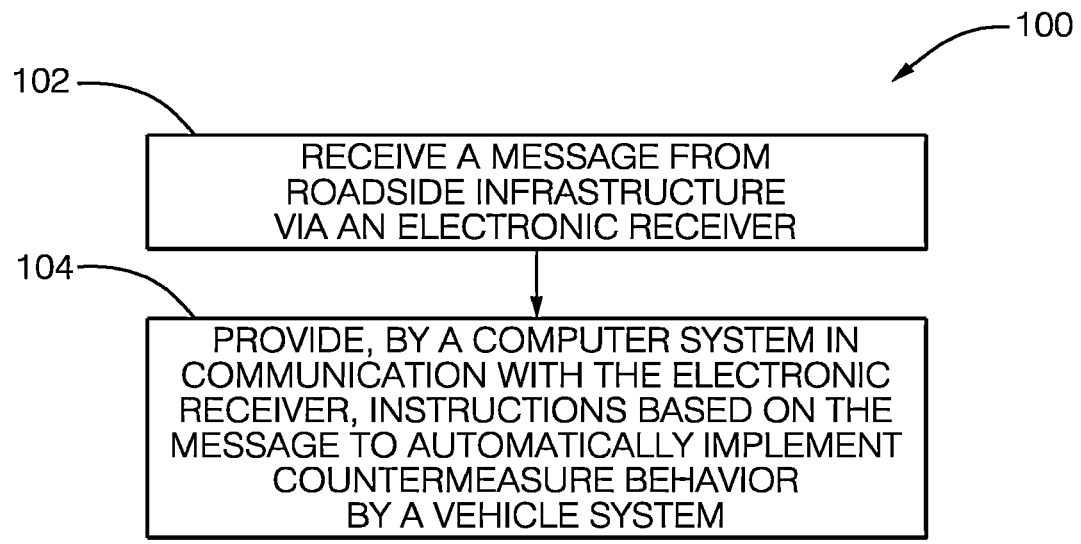
FIG. 2 is flowchart of a method of operating an autonomous vehicle according to a first embodiment.

FIG. 2 illustrates a non-limiting example of a method 100 of automatically operating an autonomous vehicle 10. The method 100 includes STEP 102, RECEIVE A MESSAGE FROM ROADSIDE INFRASTRUCTURE VIA AN ELECTRONIC RECEIVER, that include receiving a message transmitted from roadside infrastructure via an electronic receiver within the autonomous vehicle 10. As used herein, roadside infrastructure may refer to controls, signage, sensors, or other components of the roadway 12 on which the autonomous vehicle 10 travels.

The method 100 further includes STEP 104, PROVIDE, BY A COMPUTER SYSTEM IN COMMUNICATION WITH THE ELECTRONIC RECEIVER, INSTRUCTIONS BASED ON THE MESSAGE TO AUTOMATICALLY IMPLEMENT COUNTERMEASURE BEHAVIOR BY A VEHICLE SYSTEM, that includes providing instructions to a vehicle system to automatically implement countermeasure behavior. The instructions are sent to the vehicle system by a computer system that is in communication with the electronic receiver and the instruction are based on the information contained within a message received from the roadside infrastructure by the receiver.

Figure 3:
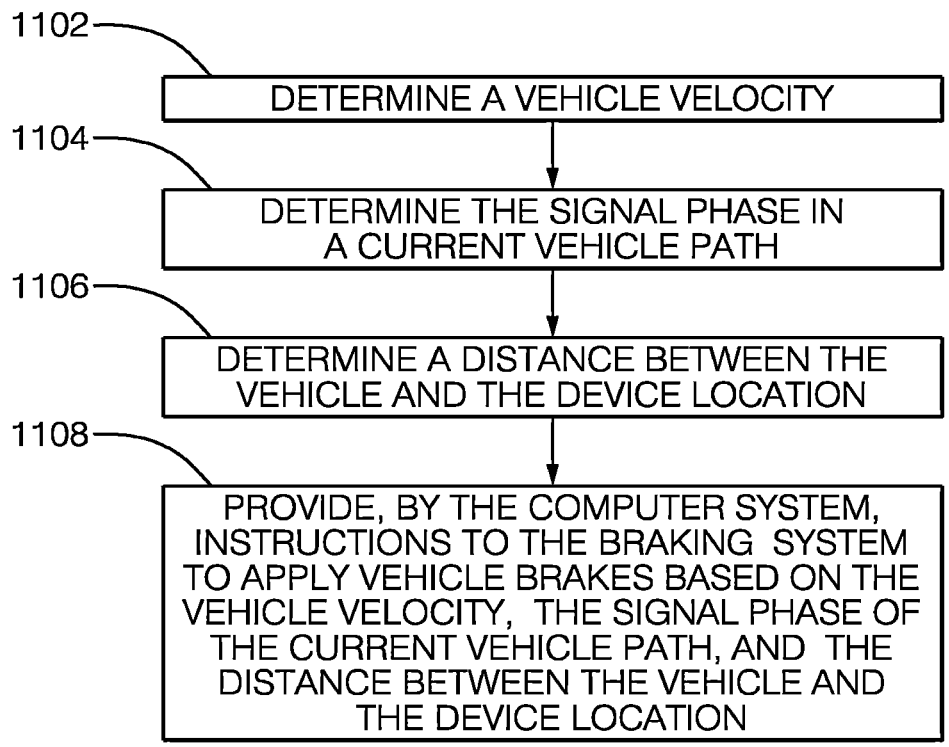
FIG. 3 is flowchart of a first set of sub-steps of STEP 104 of the method illustrated in FIG. 2.

FIG. 3 illustrates a first set of sub-steps that may be included in STEP 104. This set of sub-steps are used to automatically stop the autonomous vehicle 10 when approaching a traffic signaling device 14, e.g. stop light. SUB-STEP 1102, DETERMINE A VEHICLE SPEED, includes determining the speed of the autonomous vehicle 10 via the locating device. SUB-STEP 1104, DETERMINE THE SIGNAL PHASE IN A CURRENT VEHICLE PATH, includes determining the signal phase, e.g. red, yellow, green, of the traffic signaling device 14 along the autonomous vehicle's desired path. SUB-STEP 1106, DETERMINE A DISTANCE BETWEEN THE VEHICLE AND THE DEVICE LOCATION, includes calculating the distance between the current location of the autonomous vehicle 10 determined by the autonomous vehicle's locating device and the location of the traffic signaling device 14 contained within the message received from the traffic signaling device 14. SUB-STEP 1108, PROVIDE, BY THE COMPUTER SYSTEM, INSTRUCTIONS TO THE BRAKING SYSTEM TO APPLY VEHICLE BRAKES BASED ON THE VEHICLE SPEED, THE SIGNAL PHASE OF THE CURRENT VEHICLE PATH, AND THE DISTANCE BETWEEN THE VEHICLE AND THE DEVICE LOCATION, includes sending instructions to the vehicle braking system to apply brakes when it is determined that the autonomous vehicle 10 will need to come to a stop at the intersection controlled by the traffic signaling device 14 based on the traffic signal phase, the time remaining before the next phase change, the vehicle speed, the distance between the autonomous vehicle and the traffic signaling device location. The forward looking sensor 40 may also be employed to adjust the braking rate to accommodate other vehicles already stopped at the intersection controlled by the traffic signaling device 14.

Figure 4:
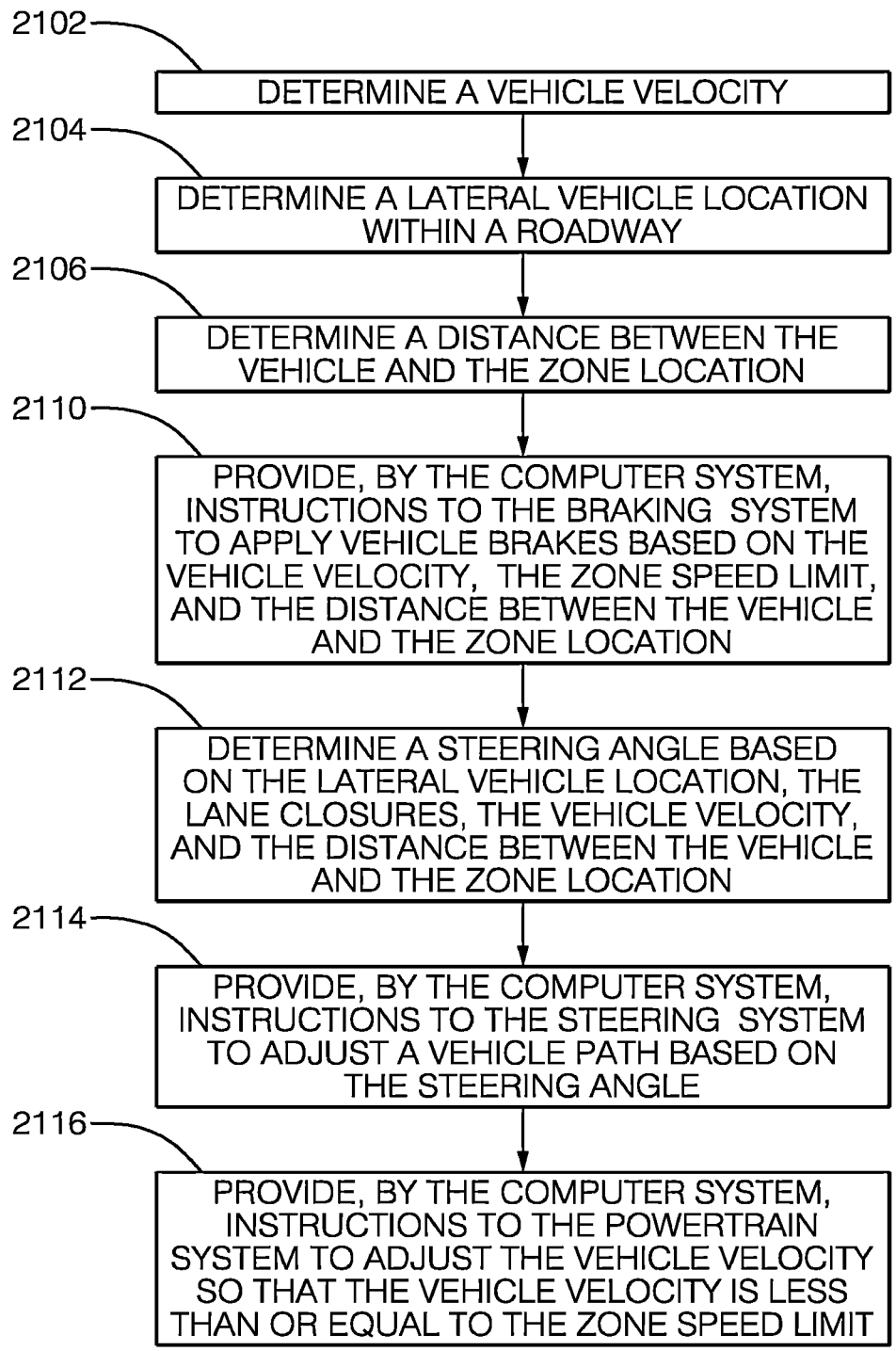
FIG. 4 is flowchart of a second set of sub-steps of STEP 104 of the method illustrated in FIG. 2.

FIG. 4 illustrates a second set of sub-steps that may be included in STEP 104. This set of sub-steps are used to automatically control the autonomous vehicle 10 when approaching a construction zone. SUB-STEP 2102, DETERMINE A VEHICLE SPEED, includes determining the speed of the autonomous vehicle via the locating device. SUB-STEP 2104, DETERMINE A LATERAL VEHICLE LOCATION WITHIN A ROADWAY, includes determine the lateral vehicle location within a roadway 12 via the locating device so that it may be determined in which road lane the autonomous vehicle 10 is traveling. SUB-STEP 2106, DETERMINE A DISTANCE BETWEEN THE VEHICLE AND THE ZONE LOCATION, includes calculating the distance between the current location of the autonomous vehicle 10 determined by the autonomous vehicle's locating device and the location of the construction zone contained within the message received from the construction zone warning device 16. SUB-STEP 2108, DETERMINE A DIFFERENCE BETWEEN THE VEHICLE SPEED AND THE ZONE SPEED LIMIT, includes calculating the difference between the speed of the autonomous vehicle 10 determined by the autonomous vehicle's locating device and the speed limit of the construction zone contained within the message received from the construction zone warning device 16. SUB-STEP 2110, PROVIDE, BY THE COMPUTER SYSTEM, INSTRUCTIONS TO THE BRAKING SYSTEM TO APPLY VEHICLE BRAKES BASED ON THE VEHICLE SPEED, THE ZONE SPEED LIMIT, AND THE DISTANCE BETWEEN THE VEHICLE AND THE ZONE LOCATION, includes sending instructions to the vehicle braking system to apply brakes when it is determined that the autonomous vehicle 10 will need to come to a reduce speed before reaching the construction zone based on the vehicle speed, the speed limit within the construction zone, and the distance between the autonomous vehicle 10 and the construction zone location. SUB-STEP 2112, DETERMINE A STEERING ANGLE BASED ON THE LATERAL VEHICLE LOCATION, THE LANE CLOSURES, THE VEHICLE SPEED, AND THE DISTANCE BETWEEN THE VEHICLE AND THE ZONE LOCATION, includes determining a steering angle to change lanes from a lane that is closed in the construction zone to a lane that is open within the construction zone when it is determined by the lateral location of the autonomous vehicle that the autonomous vehicle 10 is traveling in a lane that is indicated as closed in the message received from the construction zone warning device 16. SUB-STEP 2114, PROVIDE, BY THE COMPUTER SYSTEM, INSTRUCTIONS TO THE STEERING SYSTEM TO ADJUST A VEHICLE PATH BASED ON THE STEERING ANGLE, includes sending instructions from the computer system to the steering system to adjust the vehicle path based on the steering angle determined in SUB-STEP 2112. SUB-STEP 2116, PROVIDE, BY THE COMPUTER SYSTEM, INSTRUCTIONS TO THE POWERTRAIN SYSTEM TO ADJUST THE VEHICLE SPEED SO THAT THE VEHICLE SPEED IS LESS THAN OR EQUAL TO THE ZONE SPEED LIMIT, includes sending instructions from the computer system to the powertrain system to adjust the vehicle speed so that the vehicle speed is less than or equal to the speed limit for the construction zone contained in the message received from the construction zone warning device 16.

Figure 5:
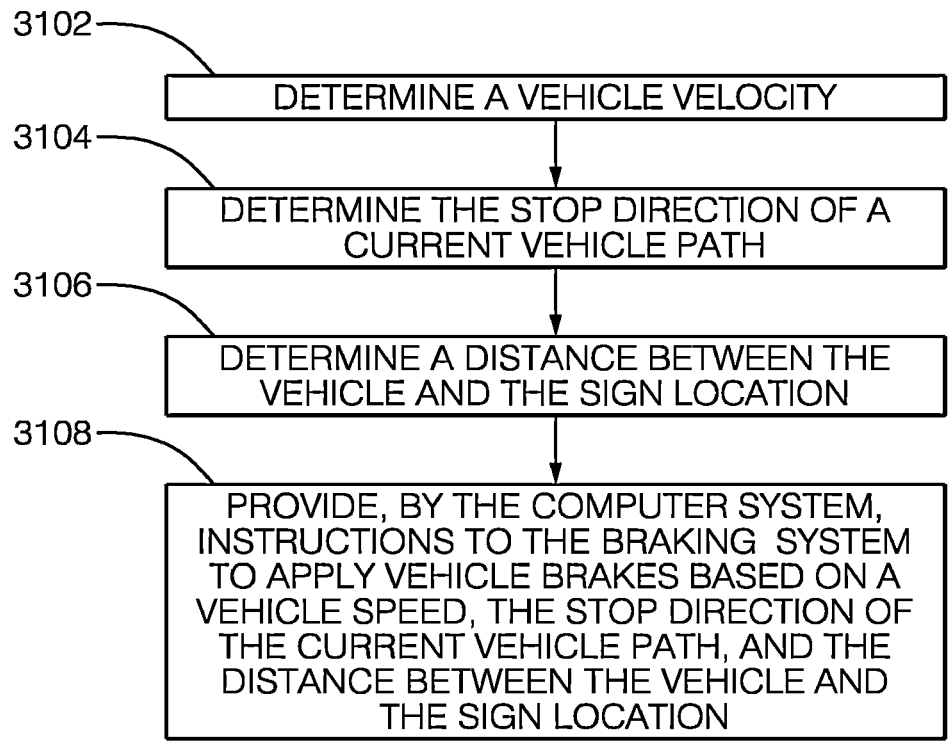
FIG. 5 is flowchart of a third set of sub-steps of STEP 104 of the method illustrated in FIG. 2.

FIG. 5 illustrates a third set of sub-steps that may be included in STEP 104. This set of sub-steps are used to automatically stop the autonomous vehicle 10 when approaching a stop sign 18. SUB-STEP 3102, DETERMINE A VEHICLE SPEED, includes determining the speed of the autonomous vehicle 10 via the locating device. Sub-step 3104, DETERMINE THE STOP DIRECTION OF A CURRENT VEHICLE PATH, includes determining whether the autonomous vehicle 10 needs to stop at the intersection controlled by the stop sign 18 based on the current direction of travel determined by the autonomous vehicle's locating device and direction of traffic required to stop reported in the message received from the stop sign transmitter. SUB-STEP 3106, DETERMINE A DISTANCE BETWEEN THE VEHICLE AND THE SIGN LOCATION, includes calculating the distance between the current location of the autonomous vehicle determined by the autonomous vehicle's locating device and the location of the stop sign 18 contained within the message received from the stop sign transmitter. SUB-STEP 3108, PROVIDE, BY THE COMPUTER SYSTEM, INSTRUCTIONS TO THE BRAKING SYSTEM TO APPLY VEHICLE BRAKES BASED ON THE VEHICLE SPEED, THE SIGNAL PHASE OF THE CURRENT VEHICLE PATH, AND THE DISTANCE BETWEEN THE VEHICLE AND THE SIGN LOCATION, includes sending instructions to the vehicle braking system to apply brakes when it is determined that the autonomous vehicle 10 will need to come to a stop at the intersection controlled by the stop sign 18 based on the direction of traffic required to stop reported in the message received from the stop sign transmitter, the vehicle speed, and the distance between the autonomous vehicle 10 and the stop sign 18 location. The forward looking sensor 40 may also be employed to adjust the braking rate to accommodate other vehicles already stopped at the intersection controlled by the stop sign 18.

Figure 6:
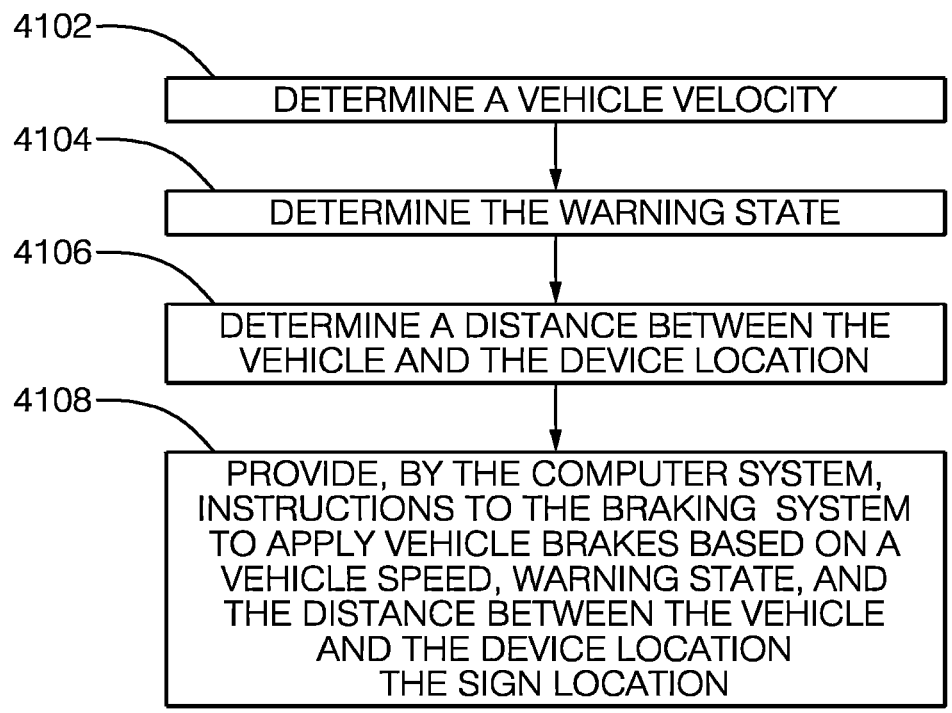
FIG. 6 is flowchart of a fourth set of sub-steps of STEP 104 of the method illustrated in FIG. 2.

FIG. 6 illustrates a fourth set of sub-steps that may be included in STEP 104. This set of sub-steps are used to automatically stop the autonomous vehicle 10 when approaching a railroad crossing. SUB-STEP 4102, DETERMINE A VEHICLE SPEED, includes determining the speed of the autonomous vehicle via the locating device. SUB-STEP 4104, DETERMINE THE WARNING STATE, includes determining the warning state of the railroad crossing warning device 20. SUB-STEP 4106, DETERMINE A DISTANCE BETWEEN THE VEHICLE AND THE DEVICE LOCATION, includes calculating the distance between the current location of the autonomous vehicle 10 determined by the autonomous vehicle's locating device and the location of the railroad crossing warning device 20 contained within the message received from the railroad crossing warning device 20. SUB-STEP 4108, PROVIDE, BY THE COMPUTER SYSTEM, INSTRUCTIONS TO THE BRAKING SYSTEM TO APPLY VEHICLE BRAKES BASED ON THE VEHICLE SPEED, WARNING STATE, AND THE DISTANCE BETWEEN THE VEHICLE AND THE DEVICE LOCATION, includes sending instructions to the vehicle braking system to apply brakes when it is determined that the autonomous vehicle 10 will need to come to a stop at the railroad crossing based on the warning state, the vehicle speed, the distance between the autonomous vehicle 10 and the railroad crossing warning device location. The forward looking sensor 40 may also be employed to adjust the braking rate to accommodate other vehicles already stopped at the railroad crossing.

Figure 7:
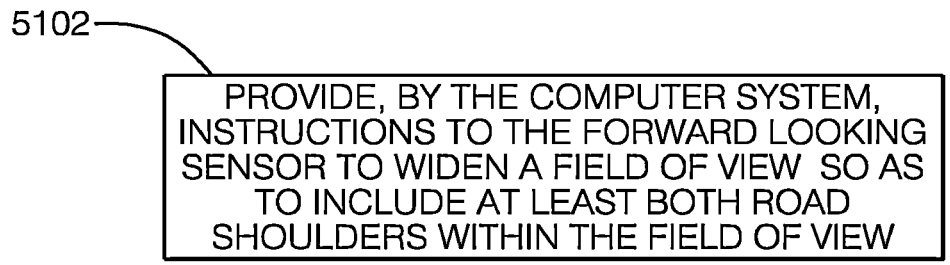
FIG. 7 is flowchart of a fifth set of sub-steps of STEP 104 of the method illustrated in FIG. 2.

FIG. 7 illustrates a fifth set of sub-steps that may be included in STEP 104. This set of sub-steps are used to automatically increase the field of view of the forward looking sensor 40 when the autonomous vehicle is approaching an animal crossing zone. SUB-STEP 5102, PROVIDE, BY THE COMPUTER SYSTEM, INSTRUCTIONS TO THE FORWARD LOOKING SENSOR TO WIDEN A FIELD OF VIEW SO AS TO INCLUDE AT LEAST BOTH ROAD SHOULDERS WITHIN THE FIELD OF VIEW, includes sending instructions to the forward looking sensor 40 to widen the field of view of the forward looking sensor 40 to include at least both shoulders of the roadway 12 when the receiver receives a message from an animal crossing zone warning device 22 and it is determined that the autonomous vehicle 10 has entered the animal crossing zone. Increasing the field of view will increase the likelihood that the forward looking sensor 40 will detect an animal entering the roadway 12.

Figure 8:
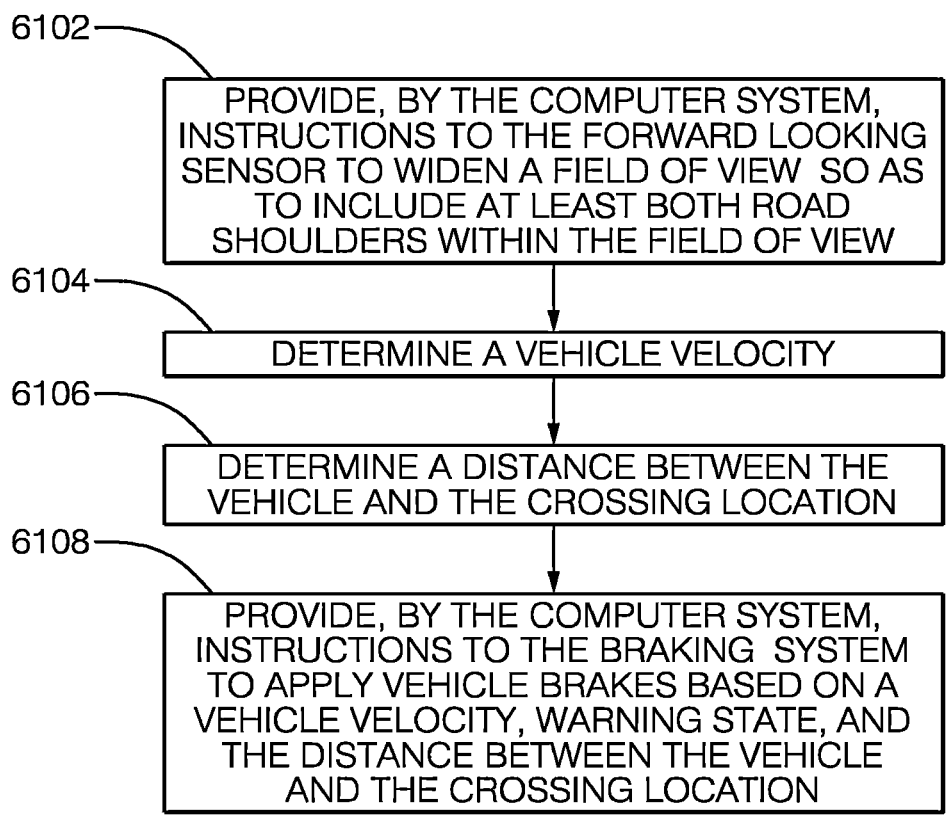
FIG. 8 is flowchart of a sixth set of sub-steps of STEP 104 of the method illustrated in FIG. 2.

FIG. 8 illustrates a sixth set of sub-steps that may be included in STEP 104. This set of sub-steps are used to automatically increase the field of view of the forward looking sensor 40 when the autonomous vehicle is approaching a pedestrian crosswalk. SUB-STEP 6102, PROVIDE, BY THE COMPUTER SYSTEM, INSTRUCTIONS TO THE FORWARD LOOKING SENSOR TO WIDEN A FIELD OF VIEW SO AS TO INCLUDE AT LEAST BOTH ROAD SHOULDERS WITHIN THE FIELD OF VIEW, includes sending instructions to the forward looking sensor 40 to widen the field of view of the forward looking sensor 40 to include at least both shoulders of the roadway 12 when the receiver receives a message from a pedestrian crossing warning device 24 and it is determined that the autonomous vehicle 10 is near the crosswalk controlled by the pedestrian crossing warning device 24. Increasing the field of view will increase the likelihood that the forward looking sensor 40 will detect pedestrian entering the crosswalk. SUB-STEP 6104, DETERMINE A VEHICLE SPEED, includes determining the speed of the autonomous vehicle 10 via the locating device. SUB-STEP 6106, DETERMINE A DISTANCE BETWEEN THE VEHICLE AND THE DEVICE LOCATION, includes calculating the distance between the current location of the autonomous vehicle 10 determined by the autonomous vehicle's locating device and the location of the pedestrian crossing warning device 24 contained within the message received from the pedestrian crossing warning device 24. SUB-STEP 6108, PROVIDE, BY THE COMPUTER SYSTEM, INSTRUCTIONS TO THE BRAKING SYSTEM TO APPLY VEHICLE BRAKES BASED ON THE VEHICLE SPEED, WARNING STATE, AND THE DISTANCE BETWEEN THE VEHICLE AND THE CROSSING LOCATION, includes sending instructions to the autonomous vehicle 10 braking system to apply brakes when it is determined that the autonomous vehicle 10 will need to come to a stop at the crosswalk based on the warning state, the vehicle speed, the distance between the autonomous vehicle and the crosswalk location. The forward looking sensor 40 may also be employed to adjust the braking rate to accommodate other vehicles already stopped at the crosswalk.

Figure 9:
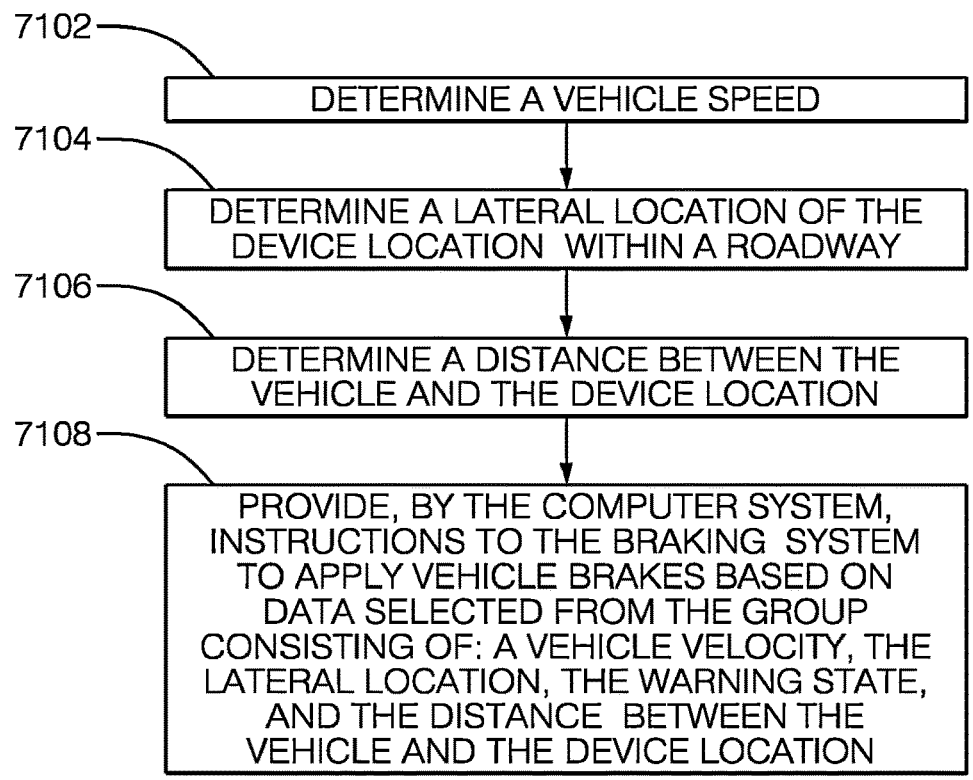
FIG. 9 is flowchart of a seventh set of sub-steps of STEP 104 of the method illustrated in FIG. 2.

FIG. 9 illustrates a seventh set of sub-steps that may be included in STEP 104. This set of sub-steps are used to automatically stop the autonomous vehicle when approaching a school crossing. SUB-STEP 7102, DETERMINE A VEHICLE SPEED, includes determining the speed of the autonomous vehicle 10 via the locating device. Sub-step 7104, DETERMINE A LATERAL LOCATION OF THE DEVICE LOCATION WITHIN A ROADWAY, includes determining the lateral position of the school crossing warning device location within the roadway 12 based on the device location reported in the message received from the school crossing warning device 26 by the receiver. If it is determined that the lateral location of the school crossing warning device 26 is within the roadway 12, the autonomous vehicle 10 will be instructed to stop regardless of the warning state received from the school crossing warning device 26. This is to ensure that failure to activate the warning state by the crossing guard operating the school crossing warning device 26 will not endanger students in the school crossing. SUB-STEP 7106, DETERMINE A DISTANCE BETWEEN THE VEHICLE AND THE DEVICE LOCATION, includes calculating the distance between the current location of the autonomous vehicle 10 determined by the autonomous vehicle's locating device and the location of the school crossing warning device 26 contained within the message received from the school crossing warning device 26. SUB-STEP 7108, PROVIDE, BY THE COMPUTER SYSTEM, INSTRUCTIONS TO THE BRAKING SYSTEM TO APPLY VEHICLE BRAKES BASED ON DATA SELECTED FROM THE GROUP CONSISTING OF: A VEHICLE SPEED, THE LATERAL LOCATION, THE WARNING STATE, AND THE DISTANCE BETWEEN THE VEHICLE AND THE DEVICE LOCATION, includes sending instructions to the vehicle braking system to apply brakes when it is determined that the autonomous vehicle 10 will need to come to a stop at the school crossing based on the warning state and/or lateral location of the school crossing warning device 26, the vehicle speed, the distance between the autonomous vehicle 10 and the location of the school crossing warning device 26. The forward looking sensor 40 may also be employed to adjust the braking rate to accommodate other vehicles already stopped at the crossing.

Figure 10:
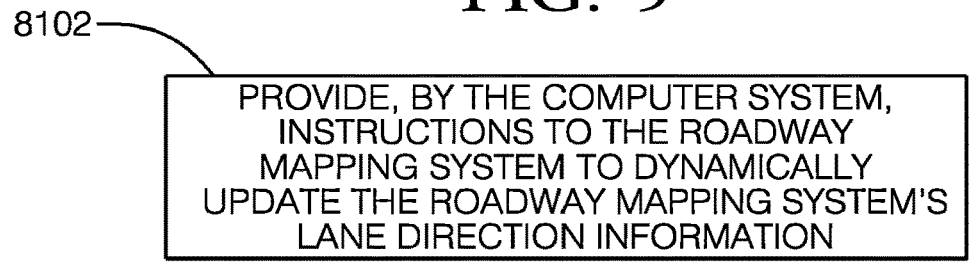
FIG. 10 is flowchart of an eighth set of sub-steps of STEP 104 of the method illustrated in FIG. 2.

FIG. 10 illustrates an eighth set of sub-steps that may be included in STEP 104. This set of sub-steps are used to automatically update the roadway mapping system to accommodate temporary lane direction changes. Sub-step 8102, PROVIDE, BY THE COMPUTER SYSTEM, INSTRUCTIONS TO THE ROADWAY MAPPING SYSTEM TO DYNAMICALLY UPDATE THE ROADWAY MAPPING SYSTEM'S LANE DIRECTION INFORMATION, includes providing by the instructions from the computer system to the roadway mapping system to dynamically update the roadway mapping system's lane direction information based on information received by the receiver from the lane direction indicating device 28. As used herein, a lane direction indicating device 28 controls the direction of travel of selected roadway lanes, such as roadway lanes that are reversed to accommodate heavy traffic during rush hours or at entrances and exits of large sporting events.

Figure 11:
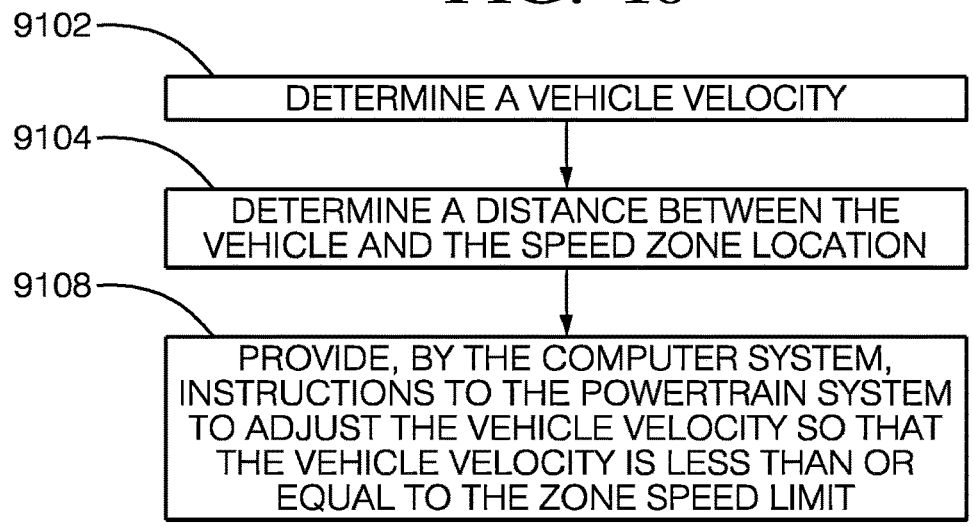
FIG. 11 is flowchart of a ninth set of sub-steps of STEP 104 of the method illustrated in FIG. 2.
Figure 12:
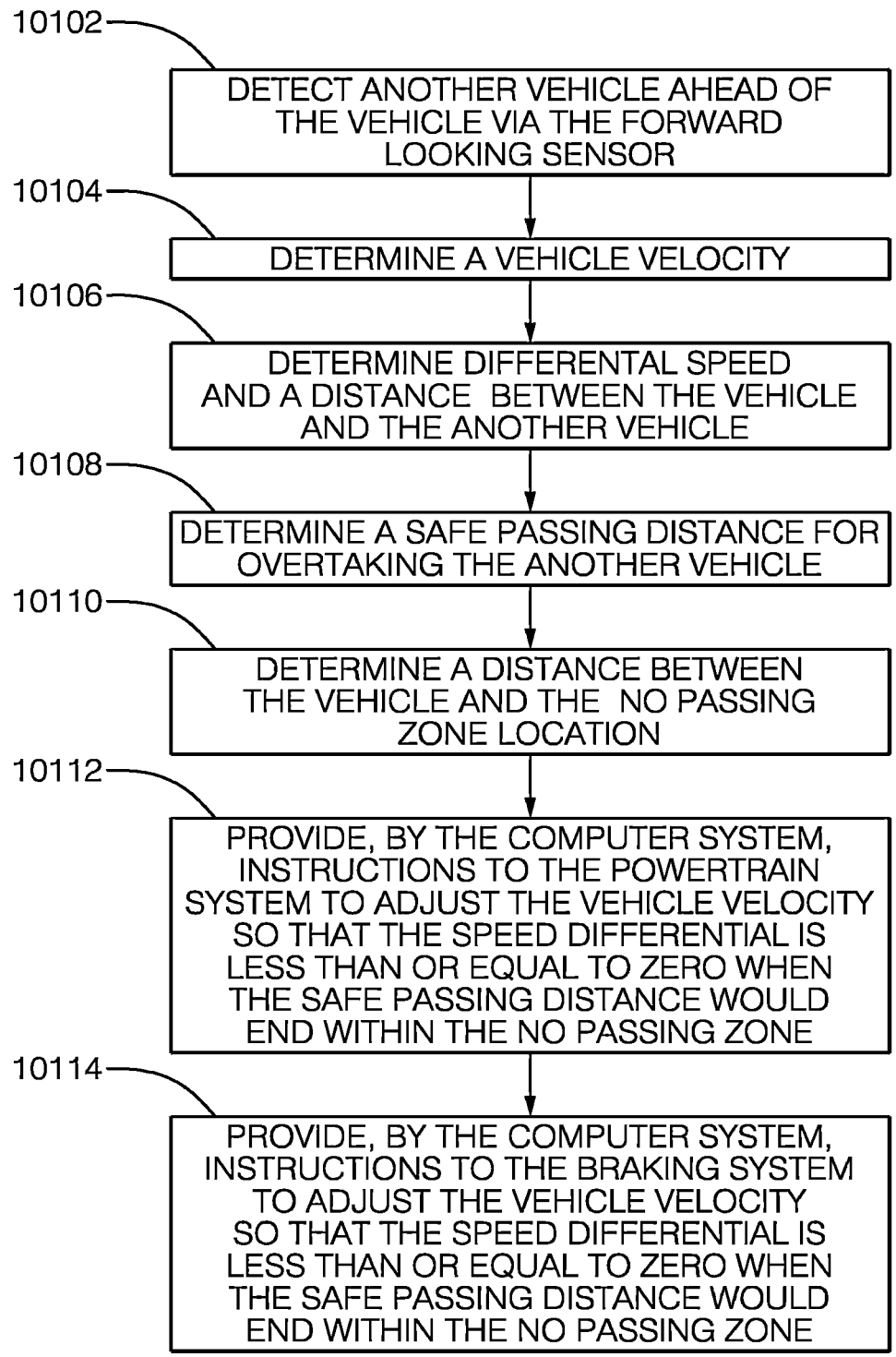
FIG. 12 is flowchart of a tenth set of sub-steps of STEP 104 of the method illustrated in FIG. 2.

FIG. 11 illustrates a ninth set of sub-steps that may be included in STEP 104. This set of sub-steps are used to automatically set the vehicle speed to match the speed limit of the section of roadway 12 on which the autonomous vehicle 10 is travelling. SUB-STEP 9102, DETERMINE A VEHICLE SPEED, includes determining the speed of the autonomous vehicle 10 via the locating device. SUB-STEP 9104, DETERMINE A DISTANCE BETWEEN THE VEHICLE AND THE SPEED ZONE LOCATION, includes calculating the distance between the current location of the autonomous vehicle 10 determined by the autonomous vehicle's locating device and the location of the speed zone contained within the message received from the speed limiting device 30. SUB-STEP 9106, DETERMINE A DIFFERENCE BETWEEN THE VEHICLE SPEED AND THE ZONE SPEED LIMIT, includes calculating the difference between the speed of the autonomous vehicle 10 determined by the autonomous vehicle's locating device and the speed limit of the speed zone contained within the message received from the speed limiting device 30. SUB-STEP 9108, PROVIDE, BY THE COMPUTER SYSTEM, INSTRUCTIONS TO THE POWERTRAIN SYSTEM TO ADJUST THE VEHICLE SPEED SO THAT THE VEHICLE SPEED IS LESS THAN OR EQUAL TO THE ZONE SPEED LIMIT, includes sending instructions from the computer system to the powertrain system to adjust the vehicle speed so that the vehicle speed is less than or equal to the speed limit for the speed zone contained in the message received from the speed limiting device 30.

FIG. 11 illustrates a tenth set of sub-steps that may be included in STEP 104. This set of sub-steps are used to automatically inhibit passing of another vehicle if the passing maneuver cannot be completed before the autonomous vehicle enters a no passing zone. Sub-step 10102, DETECT ANOTHER VEHICLE AHEAD OF THE VEHICLE VIA THE FORWARD LOOKING SENSOR, includes detecting the presence of another vehicle in the same traffic lane ahead of the autonomous vehicle via the forward looking sensor 40. SUB-STEP 10104, DETERMINE A VEHICLE SPEED, includes determining the speed of the autonomous vehicle 10 via the locating device. SUB-STEP 10106, DETERMINE AN ANOTHER VEHICLE SPEED AND A DISTANCE BETWEEN THE VEHICLE AND THE ANOTHER VEHICLE, includes determining a speed differential between the autonomous vehicle 10 and the other vehicle it is trailing via a RADAR or LIDAR based on data from the forward looking sensor 40. SUB-STEP 10108, DETERMINE A SAFE PASSING DISTANCE FOR OVERTAKING THE ANOTHER VEHICLE, includes calculating a safe passing distance for overtaking the other vehicle based on the vehicle speed and the speed differential. SUB-STEP 10110, DETERMINE A DISTANCE BETWEEN THE VEHICLE AND THE NO PASSING ZONE LOCATION, includes calculating the distance between the current location of the autonomous vehicle 10 determined by the autonomous vehicle's locating device and the location of the no passing zone contained within the message received from the no passing zone warning device 32, if the safe passing distance would end within the no passing zone, the method proceeds to SUB-STEPS 10112 and/or 10114. SUB-STEP 10112, PROVIDE, BY THE COMPUTER SYSTEM, INSTRUCTIONS TO THE POWERTRAIN SYSTEM TO ADJUST THE VEHICLE SPEED SO THAT THE VEHICLE SPEED IS LESS THAN OR EQUAL TO THE ANOTHER VEHICLE SPEED WHEN THE SAFE PASSING DISTANCE WOULD END WITHIN THE NO PASSING ZONE, includes sending instructions from the computer system to the powertrain system to adjust the vehicle speed so that the vehicle speed is less than or equal to the another vehicle speed when it is determined that the safe passing distance would end within the no passing zone. SUB-STEP 10114, PROVIDE, BY THE COMPUTER SYSTEM, INSTRUCTIONS TO THE BRAKING SYSTEM TO ADJUST THE VEHICLE SPEED SO THAT THE VEHICLE SPEED IS LESS THAN OR EQUAL TO THE ANOTHER VEHICLE SPEED WHEN THE SAFE PASSING DISTANCE WOULD END WITHIN THE NO PASSING ZONE, includes sending instructions from the computer system to the braking system to adjust the vehicle speed so that the vehicle speed is less than or equal to the another vehicle speed when it is determined that the safe passing distance would end within the no passing zone and that the speed differential between the vehicles exceeds the ability of the speed to be adjusted by the autonomous vehicle's powertrain system alone.

Figure 13:
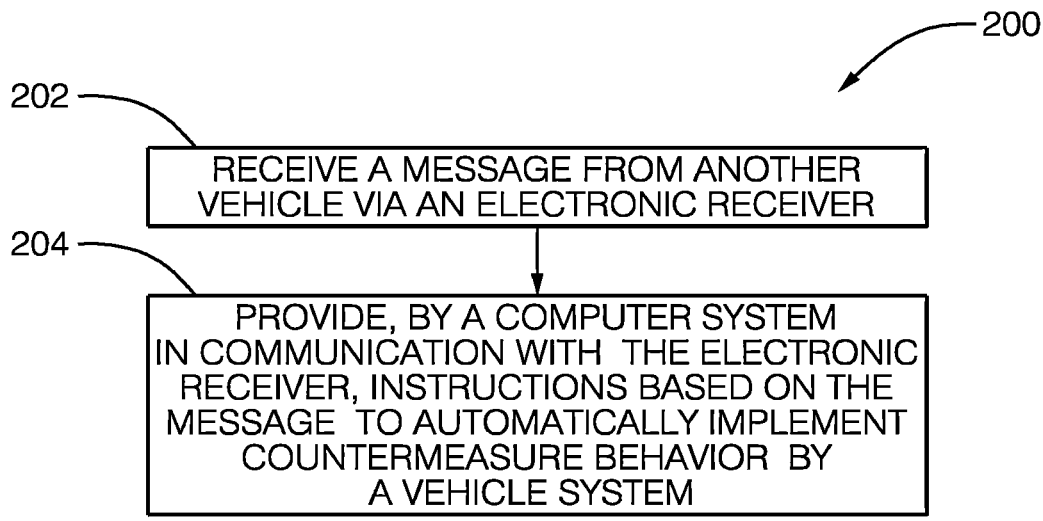
FIG. 13 is flowchart of a method of operating an autonomous vehicle according to a second embodiment.

FIG. 13 illustrates a non-limiting example of a method 200 of automatically operating an autonomous vehicle. The method 200 includes STEP 202, RECEIVE A MESSAGE FROM ANOTHER VEHICLE VIA AN ELECTRONIC RECEIVER, that includes receiving a message transmitted from another vehicle via an electronic receiver within the another vehicle.

The method 200 further includes STEP 204, PROVIDE, BY A COMPUTER SYSTEM IN COMMUNICATION WITH THE ELECTRONIC RECEIVER, INSTRUCTIONS BASED ON THE MESSAGE TO AUTOMATICALLY IMPLEMENT COUNTERMEASURE BEHAVIOR BY A VEHICLE SYSTEM, that includes providing instructions to a vehicle system to automatically implement countermeasure behavior. The instructions are sent to the vehicle system by a computer system that is in communication with the electronic receiver and the instruction are based on the information contained within a message received from the other vehicle by the receiver.

Figure 14:
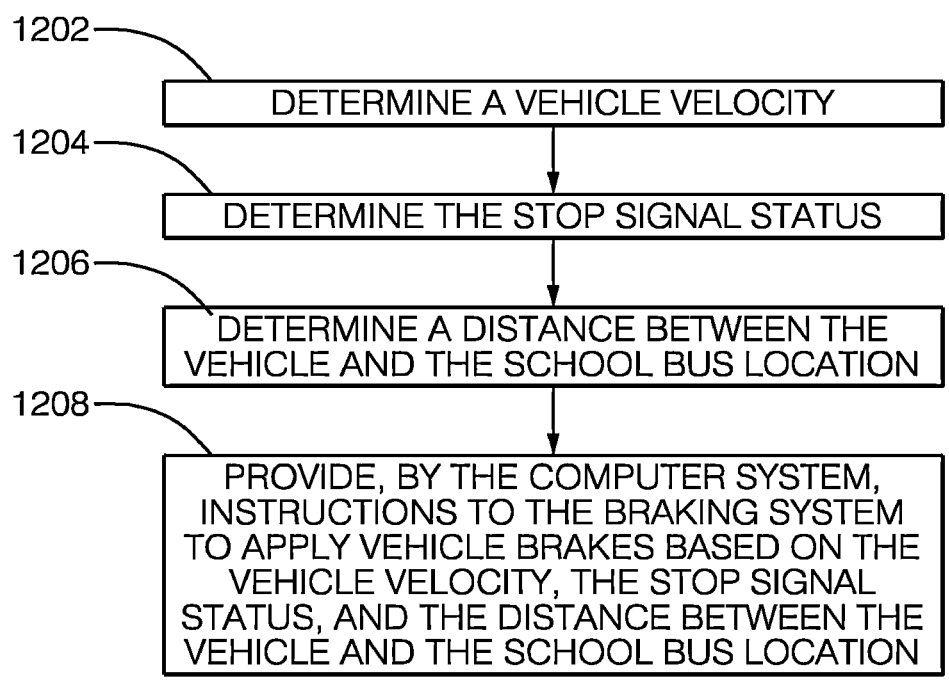
FIG. 14 is flowchart of a first set of sub-steps of STEP 204 of the method illustrated in FIG. 13.

FIG. 14 illustrates a first set of sub-steps that may be included in STEP 204. This set of sub-steps are used to automatically stop the autonomous vehicle 10 when approaching a school bus 34 that has it's stop lights activated. SUB-STEP 1202, DETERMINE A VEHICLE SPEED, includes determining the speed of the autonomous vehicle 10 via the locating device. SUB-STEP 1204, DETERMINE THE stop SIGNAL status, includes determining the status of the stop signal, e.g. off, caution, stop, reported in the message received by the receiver. SUB-STEP 1206, DETERMINE A DISTANCE BETWEEN THE VEHICLE AND THE SCHOOL BUS LOCATION, includes calculating the distance between the current location of the autonomous vehicle determined by the autonomous vehicle's locating device and the location of the school bus 34 contained within the message received from the school bus transmitter. SUB-STEP 1208, PROVIDE, BY THE COMPUTER SYSTEM, INSTRUCTIONS TO THE BRAKING SYSTEM TO APPLY VEHICLE BRAKES BASED ON THE VEHICLE SPEED, THE STOP SIGNAL STATUS, AND THE DISTANCE BETWEEN THE VEHICLE AND THE SCHOOL BUS LOCATION, includes sending instructions to the vehicle braking system to apply brakes when it is determined that the autonomous vehicle 10 will need to come to a stop at the school bus location based on the stop signal status, the vehicle speed, and the distance between the autonomous vehicle 10 and school bus location. The forward looking sensor 40 may also be employed to adjust the braking rate to accommodate other vehicles already stopped for the school bus 34.

Figure 15:
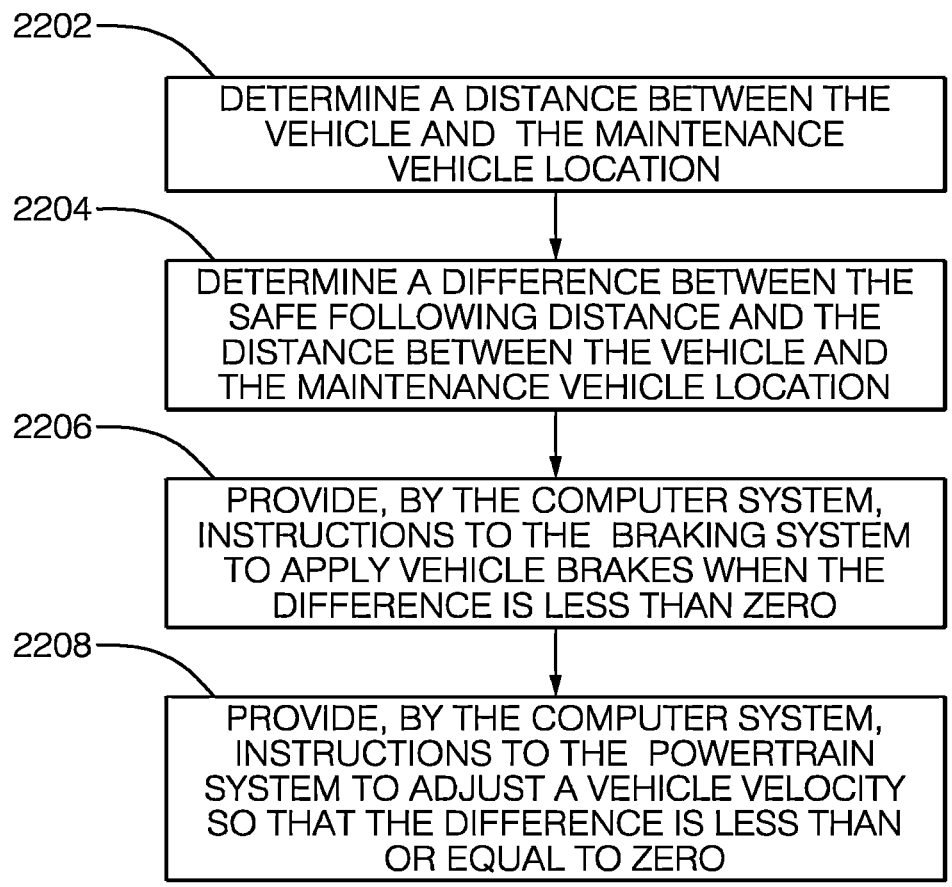
FIG. 15 is flowchart of a second set of sub-steps of STEP 204 of the method illustrated in FIG. 13.

FIG. 15 illustrates a second set of sub-steps that may be included in STEP 204. This set of sub-steps are used to automatically establish a safe following distance behind a maintenance vehicle 36. SUB-STEP 2202, DETERMINE A DISTANCE BETWEEN THE VEHICLE AND THE MAINTENANCE VEHICLE LOCATION, includes determining the distance between the autonomous vehicle 10 and the maintenance vehicle location by comparing the location of the autonomous vehicle 10 determined by the locating device with the location of the maintenance vehicle 36 contained in the message received by the receiver. SUB-STEP 2204, DETERMINE A DIFFERENCE BETWEEN THE SAFE FOLLOWING DISTANCE AND THE DISTANCE BETWEEN THE VEHICLE AND THE MAINTENANCE VEHICLE LOCATION, includes calculating the difference between the safe following distance contained in the message from the maintenance vehicle transmitter and the distance calculated in SUB-STEP 2202. SUB-STEP 2206, PROVIDE, BY THE COMPUTER SYSTEM, INSTRUCTIONS TO THE BRAKING SYSTEM TO APPLY VEHICLE BRAKES WHEN THE DIFFERENCE IS LESS THAN ZERO, includes sending instructions to the vehicle braking system to apply brakes when it is determined that the distance between the autonomous vehicle 10 and the maintenance vehicle 36 is less than the safe following distance. Sub-step 2208, PROVIDE, BY THE COMPUTER SYSTEM, INSTRUCTIONS TO THE POWERTRAIN SYSTEM TO ADJUST A VEHICLE SPEED SO THAT THE DIFFERENCE IS LESS THAN OR EQUAL TO ZERO, includes sending instructions from the computer system to the powertrain system to adjust the vehicle speed so that the difference in the distance between the autonomous vehicle 10 and the maintenance vehicle 36 and the safe following distance is less than or equal to zero, thus maintaining the safe following distance.

Figure 16:
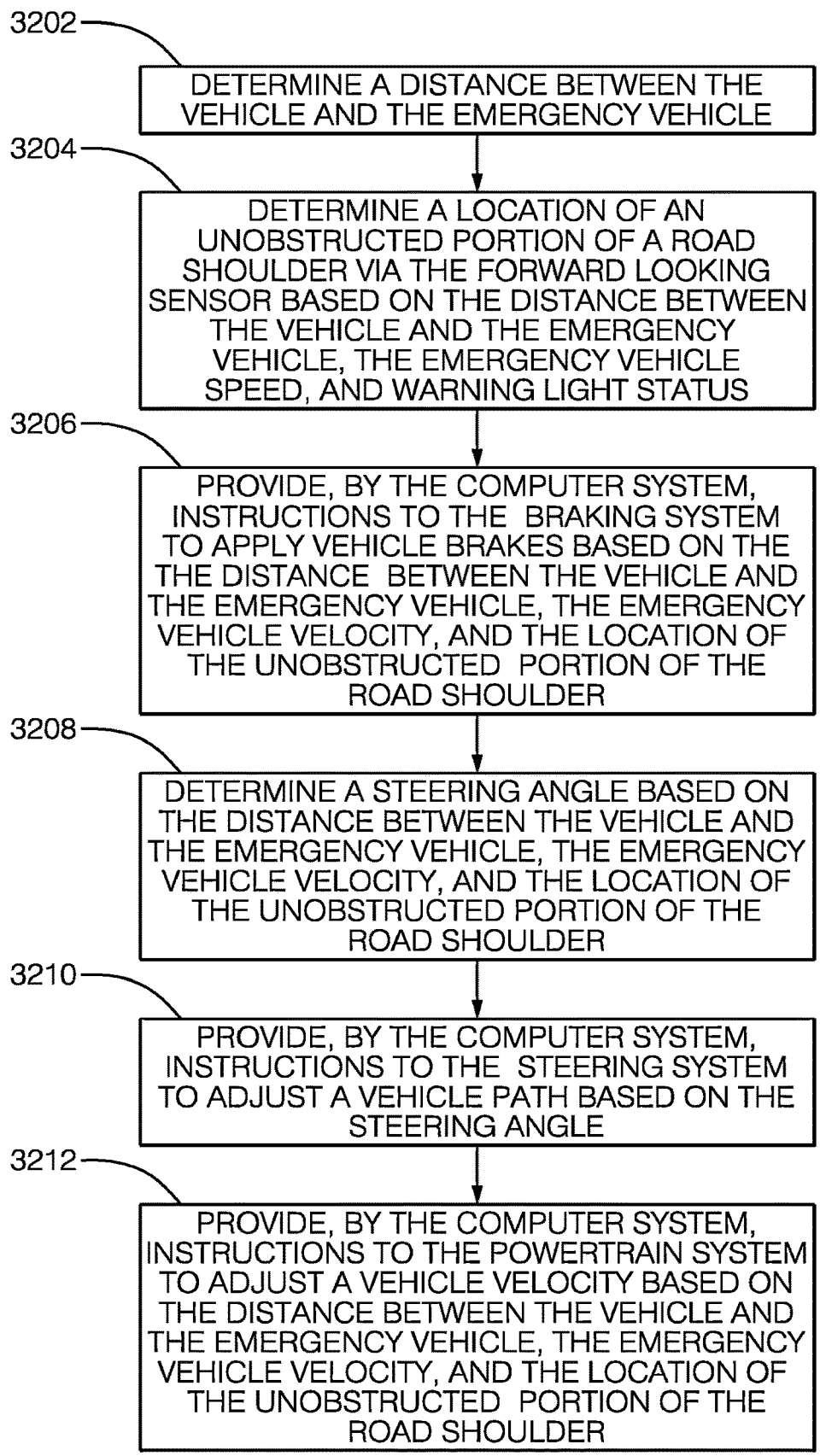
FIG. 16 is flowchart of a third set of sub-steps of STEP 204 of the method illustrated in FIG. 13.

FIG. 16 illustrates a second set of sub-steps that may be included in STEP 204. This set of sub-steps are used to automatically park the autonomous vehicle 10 on the shoulder of the road so that an emergency vehicle 38 that has its warning lights activated can safely pass the autonomous vehicle. This vehicle behavior is required by law in various states. SUB-STEP 3202, DETERMINE A DISTANCE BETWEEN THE VEHICLE AND THE EMERGENCY VEHICLE, includes determining the distance between the autonomous vehicle 10 and the emergency vehicle location by comparing the location of the autonomous vehicle 10 determined by the locating device with the location of the emergency vehicle 38 contained in the message received by the receiver. SUB-STEP 3204, DETERMINE A LOCATION OF AN UNOBSTRUCTED PORTION OF A ROAD SHOULDER VIA THE FORWARD LOOKING SENSOR BASED ON THE DISTANCE BETWEEN THE VEHICLE AND THE EMERGENCY VEHICLE, THE EMERGENCY VEHICLE SPEED, AND WARNING LIGHT STATUS, includes using the forward looking sensor 40 to find an unobstructed portion of the shoulder of the roadway 12 in which the autonomous vehicle 10 can park in order to allow the emergency vehicle 38 to pass safely. The unobstructed location is based on the data from the forward looking sensor 40, the distance between the autonomous vehicle 10 and the emergency vehicle 38, the emergency vehicle speed, and the warning light status. SUB-STEP 3206, PROVIDE, BY THE COMPUTER SYSTEM, INSTRUCTIONS TO THE BRAKING SYSTEM TO APPLY VEHICLE BRAKES BASED ON THE DISTANCE BETWEEN THE VEHICLE AND THE EMERGENCY VEHICLE, THE EMERGENCY VEHICLE SPEED, AND THE LOCATION OF THE UNOBSTRUCTED PORTION OF THE ROAD SHOULDER, includes sending instructions to the vehicle braking system to apply brakes to stop the autonomous vehicle 10 within the unobstructed location based on the distance between the autonomous vehicle 10 and the emergency vehicle 38, the emergency vehicle speed, and the location of the unobstructed portion of the road shoulder. The forward looking sensor 40 may also be employed to adjust the braking rate to accommodate other vehicles already stopped in the road shoulder. SUB-STEP 3208, DETERMINE A STEERING ANGLE BASED ON THE DISTANCE BETWEEN THE VEHICLE AND THE EMERGENCY VEHICLE, THE EMERGENCY VEHICLE SPEED, AND THE LOCATION OF THE UNOBSTRUCTED PORTION OF THE ROAD SHOULDER, includes determining a steering angle based on the distance between the autonomous vehicle 10 and the emergency vehicle 38, the emergency vehicle speed, and the location of the unobstructed portion of the road shoulder. SUB-STEP 3210, PROVIDE, BY THE COMPUTER SYSTEM, INSTRUCTIONS TO THE STEERING SYSTEM TO ADJUST A VEHICLE PATH BASED ON THE STEERING ANGLE, includes sending instructions to the vehicle steering system to steer the autonomous vehicle 10 into the unobstructed location based on the steering angle determined in SUB-STEP 3208. SUB-STEP 3212, PROVIDE, BY THE COMPUTER SYSTEM, INSTRUCTIONS TO THE POWERTRAIN SYSTEM TO ADJUST A VEHICLE SPEED BASED ON THE DISTANCE BETWEEN THE VEHICLE AND THE EMERGENCY VEHICLE, THE EMERGENCY VEHICLE SPEED, AND THE LOCATION OF THE UNOBSTRUCTED PORTION OF THE ROAD SHOULDER, includes sending instructions to the vehicle powertrain system to adjust the vehicle speed based on the distance between the autonomous vehicle 10 and the emergency vehicle 38, the emergency vehicle speed, and the location of the unobstructed portion of the road shoulder.

The embodiments described herein are described in terms of an autonomous vehicle 10. However, elements of the embodiments may also be applied to warning systems that alert the driver to manually take these identified countermeasures.

Accordingly a method 100 of automatically operating an autonomous vehicle 10 is provided. The method 100 provides the benefits of allowing automatic control of the autonomous vehicle 10 when forward looking sensors 40 are be obscured.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A method comprising:
receiving, via an electronic receiver of a vehicle, a message sent from a remote device located outside the vehicle, data contained in the message including a location to an object in a path of the vehicle; and
providing, by a computer system of the vehicle, instructions based on the received message to automatically cause one or more vehicle systems of the vehicle to implement a countermeasure behavior based in part on the location of the object in the path of the vehicle, the one or more vehicle systems including a braking system, a forward-looking sensor, a steering system, a roadway mapping system, and a powertrain system.

2. The method of claim 1, wherein:
the remote device comprises a traffic signaling device;
the location comprises a device location;
the data contained in the message further includes a signal phase and a phase timing associated with the traffic signaling device; and
providing the instructions comprises:
determining a vehicle speed of the vehicle;
determining the signal phase in the path of the vehicle;
determining a distance between the vehicle and the device location; and
providing, by the computer system, instructions to the braking system to apply brakes to slow the vehicle based on the vehicle speed, the signal phase, and the distance.

3. The method of claim 1, wherein:
the remote device comprises an animal crossing zone warning device;
the location comprises a zone location;

the data contained in the message further includes a zone direction and a zone length; and providing the instructions comprises providing, to the forward looking sensor the instructions to widen a field of view so as to include at least both road shoulders within the field of view.

4. The method of claim 1, wherein:

the remote device comprises a pedestrian crossing warning device;

the location comprises a crossing location;

the data contained in the message further includes a warning state; and providing the instructions comprises:
- providing, by the computer system, to the forward-looking sensor, the instructions to widen a field of view so as to include at least both road shoulders within the field of view;
- determining a vehicle speed of the vehicle;
- determining a distance between the vehicle and the crossing location; and
- providing, by the computer system, instructions to the braking system to apply brakes to slow the vehicle based on the vehicle speed, the warning state, and the distance.

5. The method of claim 1, wherein:

the remote device comprises a school crossing warning device;

the location comprises a device location;

the data contained in the message further includes a warning state; and providing the instructions comprises:
- determining a vehicle speed of the vehicle;
- determining a lateral location of the device location within a roadway;
- determining a distance between the vehicle and the device location; and
- providing, by the computer system, instructions to the braking system to apply brakes to slow the vehicle based on one or more from the group consisting of: a vehicle speed, the lateral location, the warning state, and the distance between the vehicle and the device location.

6. The method of claim 1, wherein:

the remote device comprises a lane direction indicating device;

the location comprises a lane location;

the data contained in the message further includes a lane direction; and providing the instructions comprises providing, by the computer system, instructions to the roadway mapping system to dynamically update lane direction information.

7. The method of claim 1, wherein:

the remote device comprises a no passing zone device;

the location comprises a no passing zone location;

the data contained in the message further includes a no passing zone length; and providing the instructions comprises:
- detecting, via the forward-looking sensor, another vehicle ahead of the vehicle;
- determining a vehicle speed of the vehicle;
- determining another vehicle speed of the other vehicle;
- determining a distance between the vehicle and the other vehicle;
- determining a safe passing distance for the vehicle to overtake the other vehicle;
- determining a distance between the vehicle and the no passing zone location;
- providing, by the computer system, instructions to the powertrain system to adjust the vehicle speed so that the speed differential is less than or equal to zero when the safe passing distance would end within the no passing zone; and
- providing, by the computer system, instructions to the braking system to adjust the vehicle speed so that the vehicle speed is less than or equal to the other vehicle speed when the safe passing distance would end within the no passing zone.

8. The method of claim 1, wherein:

the remote device comprises a construction zone warning device;

the location comprises a zone location;

the data contained in the message further includes information selected from the group of: a zone direction, a zone length, a zone speed limit, and lane closures; and providing the instructions includes:
- determining a vehicle speed of the vehicle;
- determining a lateral vehicle location of the vehicle within a roadway;
- determining a distance between the vehicle and the zone location;
- determining a steering angle based on the lane closures, and the distance between the vehicle and the zone location;
- providing, by the computer system, instructions to the steering system to adjust the vehicle path based on the steering angle; and
- providing, by the computer system, instructions to the powertrain system to adjust the vehicle speed so that the vehicle speed is less than or equal to the zone speed limit.

9. The method of claim 1, wherein:

the remote device comprises a stop sign;

the location comprises a sign location;

the data contained in the message further includes a stop direction; and providing the instructions includes:
- determining a vehicle speed of the vehicle;
- determining the stop direction of the vehicle path;
- determining a distance between the vehicle and the sign location; and
- providing, by the computer system, instructions to the braking system to apply vehicle brakes based on a vehicle speed, the stop direction of the vehicle path, and the distance between the vehicle and the sign location.

10. The method of claim 1, wherein:

the remote device comprises a railroad crossing warning device;

the location comprises a device location;

the data contained in the message further includes a warning state; and providing the instructions includes:
- determining a vehicle speed of the vehicle;
- determining a distance between the vehicle and the device location; and
- providing, by the computer system, instructions to the braking system to apply vehicle brakes based on the vehicle speed, the warning state, and the distance between the vehicle and the device location.

11. The method of claim 1, wherein:

the remote device comprises a speed limiting device;

the location comprises a speed zone location;

the data contained in the message further includes a speed zone direction, a speed zone length, and a zone speed limit; and providing the instructions includes:
determining a vehicle speed of the vehicle;
determining a distance between the vehicle location and the speed zone location; and
providing, by the computer system, instructions to the powertrain system to adjust the vehicle speed so that the vehicle speed is less than or equal to the zone speed limit.

12. A system comprising a vehicle, the vehicle comprising:
multiple vehicle systems including a braking system, a forward-looking sensor, a steering system, a roadway mapping system, and a powertrain system;
an electronic receiver configured to receive a message sent from a remote device located outside the vehicle, data contained in the message including a location to an object in a path of the vehicle; and
a computer system configured to provide, based on the received message, instructions to automatically cause one or more of the vehicle systems to implement a countermeasure behavior based in part on the location of the object in the path of the vehicle.

13. The system of claim 12, wherein:
the remote device comprises a traffic signaling device;
the location comprises a device location;
the data contained in the message further includes a signal phase and a phase timing associated with the traffic signaling device; and
the computer system is configured to provide the instructions by at least:
determining a vehicle speed of the vehicle;
determining the signal phase in the path of the vehicle;
determining a distance between the vehicle and the device location; and
providing, by the computer system, instructions to the braking system to apply brakes to slow the vehicle based on the vehicle speed, the signal phase, and the distance.

14. The system of claim 12, wherein:
the remote device comprises an animal crossing zone warning device;
the location comprises a zone location;
the data contained in the message further includes a zone direction and a zone length; and
the computer system is configured to provide the instructions by at least providing, to the forward-looking sensor the instructions to widen a field of view so as to include at least both road shoulders within the field of view.

15. The system of claim 12, wherein:
the remote device comprises a pedestrian crossing warning device;
the location comprises a crossing location;
the data contained in the message further includes a warning state; and
the computer system is configured to provide the instructions by at least:
providing, to the forward-looking sensor, first instructions to widen a field of view so as to include at least both road shoulders within the field of view;
determining a vehicle speed of the vehicle;
determining a distance between the vehicle and the crossing location; and
providing, to the braking system, second instructions to apply brakes to slow the vehicle based on the vehicle speed, the warning state, and the distance.

16. The system of claim 12, wherein:
the remote device comprises a school crossing warning device;
the location comprises a device location;
the data contained in the message further includes a warning state; and
the computer system is configured to provide the instructions by at least:
determining a vehicle speed of the vehicle;
determining a lateral location of the device location within a roadway;
determining a distance between the vehicle and the device location; and
providing instructions to the braking system to apply brakes to slow the vehicle based on one or more from the group consisting of: a vehicle speed, the lateral location, the warning state, and the distance between the vehicle and the device location.

17. The system of claim 12, wherein:
the remote device comprises a lane direction indicating device;
the location comprises a lane location;
the data contained in the message further includes a lane direction; and
the computer system is configured to provide the instructions by at least providing instructions to the roadway mapping system to dynamically update lane direction information.

18. The system of claim 12, wherein:
the remote device comprises a no passing zone device;
the location comprises a no passing zone location;
the data contained in the message further includes a no passing zone length; and
the computer system is configured to provide the instructions by at least:
detecting, via the forward-looking sensor, another vehicle ahead of the vehicle;
determining a vehicle speed of the vehicle;
determining another vehicle speed of the other vehicle;
determining a distance between the vehicle and the other vehicle;
determining a safe passing distance for the vehicle to overtake the other vehicle;
determining a distance between the vehicle and the no passing zone location;
providing first instructions to the powertrain system to adjust the vehicle speed so that the speed differential is less than or equal to zero when the safe passing distance would end within the no passing zone; and
providing second instructions to the braking system to adjust the vehicle speed so that the vehicle speed is less than or equal to the other vehicle speed when the safe passing distance would end within the no passing zone.

19. The system of claim 12, wherein:
the remote device comprises a construction zone warning device;
the location comprises a zone location;
the data contained in the message further includes information selected from the group of: a zone direction, a zone length, a zone speed limit, and lane closures; and
the computer system is configured to provide the instructions by at least:
determining a vehicle speed of the vehicle;

determining a lateral vehicle location of the vehicle within a roadway;

determining a distance between the vehicle and the zone location;

determining a steering angle based on the lane closures, and the distance between the vehicle and the zone location;

providing first instructions to the steering system to adjust the vehicle path based on the steering angle; and providing second instructions to the powertrain system to adjust the vehicle speed so that the vehicle speed is less than or equal to the zone speed limit.

20. The system of claim 12, wherein:

the remote device comprises a stop sign;

the location comprises a sign location;

the data contained in the message further includes a stop direction; and the computer system is configured to provide the instructions by at least:

determining a vehicle speed of the vehicle;

determining the stop direction of the vehicle path;

determining a distance between the vehicle and the sign location; and providing instructions to the braking system to apply vehicle brakes based on a vehicle speed, the stop direction of the vehicle path, and the distance between the vehicle and the sign location.

* * * * *